US012432094B2

(12) United States Patent
Aweya et al.

(10) Patent No.: US 12,432,094 B2
(45) Date of Patent: Sep. 30, 2025

(54) METHODS AND SYSTEMS FOR VALIDATING LOCATIONS USING CHANGES IN CHANNEL CHARACTERISTICS

(71) Applicants: Khalifa University of Science and Technology, Abu Dhabi (AE); British Telecommunications PLC, London (GB); Emirates Telecommunications Corporation, Abu-Dhabi (AE)

(72) Inventors: James Aweya, Abu Dhabi (AE); Nawaf Almoosa, Abu Dhabi (AE)

(73) Assignees: Khalifa University of Science and Technology, Abu Dhabi (AE); British Telecommunications PLC, London (GB); Emirates Telecommunications Corporation, Abu-Dhabi (AE)

(*) Notice: Subject to any disclaimer, the term of this patent is extended or adjusted under 35 U.S.C. 154(b) by 144 days.

(21) Appl. No.: 18/256,225

(22) PCT Filed: Dec. 7, 2020

(86) PCT No.: PCT/GB2020/053135
§ 371 (c)(1),
(2) Date: Jun. 7, 2023

(87) PCT Pub. No.: WO2022/123191
PCT Pub. Date: Jun. 16, 2022

(65) Prior Publication Data
US 2024/0031202 A1 Jan. 25, 2024

(51) Int. Cl.
*H04L 25/02* (2006.01)
*H04W 64/00* (2009.01)
(52) U.S. Cl.
CPC ......... *H04L 25/0212* (2013.01); *H04W 64/00* (2013.01)

(58) Field of Classification Search
CPC .................. H04L 25/0212; H04W 64/00
See application file for complete search history.

(56) References Cited

U.S. PATENT DOCUMENTS 8,880,105 B2  11/2014  Aweya
9,173,067 B2*  10/2015  Aggarwal ........... G01S 5/02528
(Continued)

OTHER PUBLICATIONS

Chen Luan et al: "CSI-Based Probabilistic Indoor Position Determination: An Entropy Solution", IEEE Access, vol. 7, Nov. 9, 2019 (Nov. 9, 2019).

(Continued)

*Primary Examiner* — Jaison Joseph
(74) *Attorney, Agent, or Firm* — Calfee, Halter & Griswold LLP

(57) ABSTRACT

This invention relates to methods and systems for determining whether a reference point in a location system has changed using the entropy of channel impulse responses. In one embodiment a method of determining whether the location of a first one of a plurality of reference points used in a location system has changed is provided. The reference points each have a known initial position and the method includes the steps of: estimating a channel impulse response of a wireless channel between the first reference point and a second of said plurality of reference points; determining the difference between the estimated channel impulse response and a previously-estimated channel impulse response of the wireless channel; estimating an entropy of the difference between the channel impulse responses; and determining, from said comparison, whether the location of the first reference point has changed. In another embodiment the method includes the steps of: estimating an entropy of the channel impulse response of a wireless channel between the first reference point and a second of said plurality of reference points; comparing the estimated entropy to a (Continued)

previously-estimated entropy for the channel impulse response of the wireless channel; determining, from said comparison, whether the location of the first reference point has changed.

33 Claims, 9 Drawing Sheets

(56) References Cited

U.S. PATENT DOCUMENTS

| | | | |
|---|---|---|---|
| 9,344,990 B1* | 5/2016 | Bali | H04W 4/029 |
| 9,386,422 B1* | 7/2016 | Aragon | G01S 5/0218 |
| 9,553,639 B2* | 1/2017 | Babaei | H04B 7/0413 |
| 10,349,214 B2* | 7/2019 | Sen | G01S 5/10 |
| 2010/0207732 A1* | 8/2010 | Patwari | H04W 12/126 |
| | | | 340/10.1 |
| 2013/0172020 A1* | 7/2013 | Aweya | G01S 5/02521 |
| | | | 455/457 |
| 2014/0062793 A1* | 3/2014 | AlSindi | G01S 5/0218 |
| | | | 342/450 |
| 2015/0163851 A1* | 6/2015 | Babaei | H04W 64/00 |
| | | | 375/267 |
| 2024/0031202 A1* | 1/2024 | Aweya | H04L 25/0212 |

OTHER PUBLICATIONS

Ezio Biglieri, Coding for Wireless Channels, Springer, 2005.
Mehmet Kemal Ozdemir and Huseyn Arslan, "Channel Estimation for Wireless OFDM Systems", IEEE Communications Surveys & Tutorials, 2nd Quarter 2007.
David Tse and Pramod Viswanath, Fundamentals of Wireless Communication, Cambridge University Press, 2005.
G. L. Turin, et al., "A Statistical Model of Urban Multipath Propagation," IEEE Trans. Vehicular Techn., vol. VT-21, pp. 1-9, Feb. 1972.
National Instruments, "Impulse Response Model of a Multipath Channel", White Paper, Sep. 25, 2013.
Homayoun Hashemi, "The Indoor Radio Propagation Channel", Proceedings of the IEEE, vol. 81, No. 7, Jul. 1993.
B. Yang, K.B. Letaief, R. S. Cheng and Z. Cao, "Channel Estimation for OFDM Transmission in Multipath Fading Channels based on Parametric Channel Modeling," IEEE Trans. on Commun., vol. 49, No. 3, Mar. 2001.
C. E. Shannon, "A Mathematical Theory of Communication," Bell Syst. Tech. J., vol. 27, pp. 379-423; 623-656, Jul./Oct. 1948.
J.F. Bercher, C. Vigant, "Estimating the Entropy of a Signal with Applications", IEEE Trans. on Signal Processing, vol. 48, No. 6, pp. 1687-1694, Jun. 2000.
R. Moddemeijer, "On estimation of entropy and mutual information of continuous distributions," Signal Processing, vol. 16, No. 3, pp. 233-246, 1989.
P. Hall and S. Morton, "On the estimation of entropy," Ann. Inst. Stat. Math., vol. 45, pp. 69-88, 1993.
O. Vasicek, "A Test of Normality based on Sample Entropy," J. R. Stat. Soc. Ser. B, vol. 38, pp. 54-59, 1976.
J. C. Correa, "A New Estimator of Entropy," Commun. Stat.—Theory Methodol., vol. 24, pp. 2439-2449, 1995.
P. Viola, N. N. Schraudolph and T. J. Sejnowski, "Empirical entropy manipulation for real-world problems," in Advances in Neural Information Processing Systems 8. Cambridge, MA: MIT Press, 1996.
D. T. Pham, "Blind Separation of Instantaneous Mixture of Sources via an Independent Component Analysis," IEEE Trans. Signal Processing, vol. 44, pp. 2768-2779, Nov. 1996.
S. Kay, "Model-Based Probability Density Function Estimation," IEEE Signal Processing Letters, vol. 5, No. 12, Dec. 1998.
M. H. Hayes, Statistical Digital Signal Processing and Modeling, John Wiley & Sons, Inc., 1996.
G. Kitagawa and W. Gersh, "A Smoothness Priors Long AR Model Method for Spectral Estimation," IEEE Trans. Automat. Contrl., vol. AC-30, pp. 57-65, 1985.
J.-F. Giovannelli, G. Demoment and A. Herment, "A Bayesian Method for Long AR Spectra Estimation: A Comparative Study," IEEE Trans. Ultrason. Freq. Ferroelect., vol. 43, pp. 220-233, Mar. 1996.
International Search Report and Written Opinion from PCT/GB2020/053135 dated Dec. 7, 2020.

\* cited by examiner a)

b)

METHODS AND SYSTEMS FOR VALIDATING LOCATIONS USING CHANGES IN CHANNEL CHARACTERISTICS

RELATED APPLICATIONS

This application claims priority to and all benefits of International Application No. PCT/GB2020/053135, filed on Dec. 7, 2020 for METHODS AND SYSTEMS FOR VALIDATING LOCATIONS USING CHANGES IN CHANNEL CHARACTERISTICS, the entire disclosure of which is fully incorporated herein by reference.

FIELD OF THE INVENTION

The present invention relates to methods and systems for validating locations. It is particularly, but not exclusively, concerned with methods and systems for validating the location of access points, in particular reference access points in wireless networks such as WLANs.

BACKGROUND OF THE INVENTION

The Global Positioning System (GPS) is one example of a Global Navigation Satellite System (GNSS) that provides geolocation and time information services in many applications, such as navigation and emergency location services (E911). GPS provides these services by sending signals to GPS receivers near or on the surface of the Earth that have an unobstructed line-of-sight (LOS) to four or more GPS satellites. GPS, however, does have a number of limitations because the signals can be blocked by obstacles such buildings, mountains, tall overhead structures, etc.

GPS receivers typically do not work well or at all in the indoor environment because the relatively weak signals that are transmitted from the geostationary satellites are attenuated or blocked by the structures of the building that the receivers are located in. For these reasons and others, location techniques that can operate in the indoor environment (using, for example, wireless Local Area Network (WLAN) or WiFi technologies) are sought to complement the services provided by GPS. There is growing interest in the integration of GPS and indoor positioning systems with the goal of making positioning more ubiquitous.

Location systems based on WiFi (IEEE 802.11) are generating a lot of interest due to the ubiquity of WiFi and its presence in almost all aspects of our lives (in schools, hospitals, shopping malls, offices, factories, airports, etc.). This has made the need for location systems based on WiFi a pressing issue and an active area of research both in the industry and academia. The indoor environment itself presents significant challenges to localization. The location system has to address tough challenges like non-line-of-sight (NLOS) and multipath propagation errors to provide accurate location estimates.

Similar to GPS, there are numerous applications for indoor location systems (i.e., location based services). Some applications include indoor navigation, location-based security, printer finding based on one's location, location-based information access and sharing, people tracking, asset tracking and management, and location-based games.

Indoor location can also be combined with Radio Frequency Identification (RFID) readers and asset tagging to achieve some of the applications above. The location of an RFID reader can be determined and the reader in turn can be used to scan RFID tags. For example, in automated inventory systems, the automatically located wireless RFID reader records into the inventory database any tag that it scans. The location system infers the location of an RFID tag by estimating the location of the reader and then makes entries into the database the items it scans.

The most common localization techniques are RSSI, TDOA, TOA, and AOA. All these techniques have two main components, a measurement component and a location computation component. The measurement component performs the functions of: measuring distance from signal power loss between a transmitter and receiver in RSSI; measuring distance between a transmitter and receiver using a two-way ranging protocol or time synchronized transmitter and receiver in TOA; measuring time/range differences between a number of receivers receiving a signal sent from a transmitter in TDOA; and, measuring angle of arrival of a signal at a receiver sent from a transmitter. The location computation component uses the data from the measurement block to determine a location estimate.

The positions of the reference points used in the location estimates of clients is a key requirement in location systems and has to be known at all times the system is operational. This is because accurate localization depends heavily on how accurate the positions of the reference points are known. Errors due to inaccurate recording of the positions of the reference points translate directly into an error in the location estimates. This error is an additional error on top of the other sources of error such as NLOS and multipath propagation errors, as well as any computational errors that may arise in the location computation algorithm.

The location computation algorithm is the component in the location system that computes the location of the client when given the raw input measurements such as ranges (in TOA), range differences (in TDOA), angles (in AOA), etc. Even if these input measurements are accurate, errors in the positions of the reference points will render the client location estimate inaccurate. Regardless of whether the positions are absolute or relative to another reference (e.g., GPS), they have to be accurate to be meaningful in the location computation.

Particularly, in location systems that use WiFi access points (APs), there is no guarantee that a technician would not unintentionally move the AP when carrying out maintenance or repair works (as shown, schematically, in FIG. 1). The location system will require that all moves be known and the new locations of the reference points be accurately determined and the location records updated. However, it is not necessarily safe to operate under the assumption that all AP moves will be known and recorded. Therefore the location system cannot simply take the recorded locations of the reference points as the absolute truth because a technician might assume that moving the position by, for example, 3 meters will not adversely affect system operations, or might be entirely unaware that a location system is reliant on the positioning of the AP.

An object of the present invention is to address the above problems by providing techniques for validating the location of the reference points.

SUMMARY OF THE INVENTION

An exemplary embodiment of the invention provides a method of determining whether the location of a first one of a plurality of reference points used in a wireless location system has changed, the reference points each having a known initial position, the method including the steps of: estimating a channel impulse response of a wireless channel between the first reference point and a second of said plurality of reference points; determining the difference between the estimated channel impulse response and a previously-estimated channel impulse response of the wireless channel; estimating an entropy of the difference between the channel impulse responses; and determining, from said comparison, whether the location of the first reference point has changed.

A further exemplary embodiment of the invention provides a method of determining whether the location of a first one of a plurality of reference points used in a wireless location system has changed, the reference points each having a known initial position, the method including the steps of: estimating an entropy of the channel impulse response of a wireless channel between the first reference point and a second of said plurality of reference points; comparing the estimated entropy to a previously-estimated entropy for the channel impulse response of the wireless channel; determining, from said comparison, whether the location of the first reference point has changed.

A further exemplary embodiment of the invention provides a location system having a plurality of reference points each having a known initial position and arranged to exchange wireless messages with a mobile device to determine the location of the mobile device, the system including a processor which is arranged to: estimate a channel impulse response of a wireless channel between the first reference point and a second of said plurality of reference points; determine the difference between the estimated channel impulse response and a previously-estimated channel impulse response of the wireless channel; estimate an entropy of the difference between the channel impulse responses; and determine, from said comparison, whether the location of the first reference point has changed.

A further exemplary embodiment of the invention provides a location system having a plurality of reference points each having a known initial position and arranged to exchange wireless messages with a mobile device to determine the location of the mobile device, the system including a processor which is arranged to: estimate an entropy of the channel impulse response of a wireless channel between the first reference point and a second of said plurality of reference points; compare the estimated entropy to a previously-estimated entropy for the channel impulse response of the wireless channel; determine, from said comparison, whether the location of the first reference point has changed.

BRIEF DESCRIPTION OF THE DRAWINGS

Embodiments of the invention will now be described by way of example with reference to the accompanying drawings in which.

DETAILED DESCRIPTION

Figure 1:
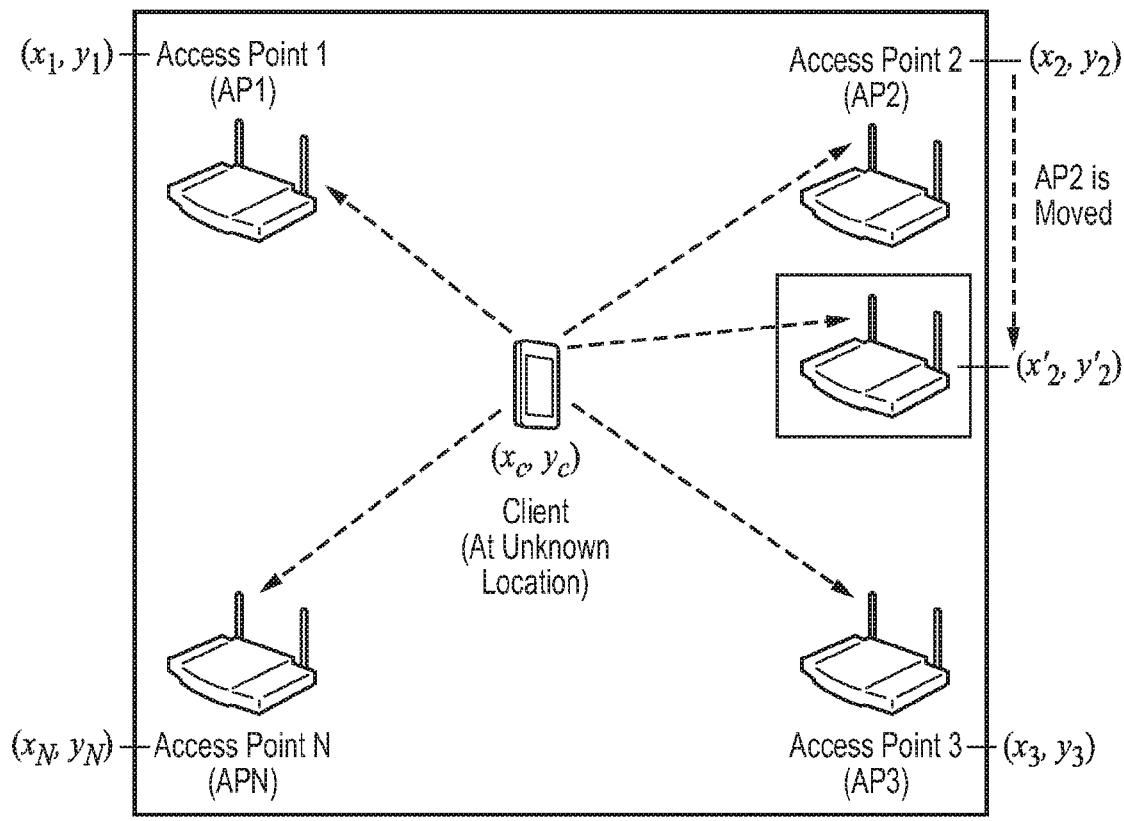
FIG. 1 shows a typical wireless network and illustrates the effect of unintentional relocation of an access point.

At their broadest, aspects of the present invention provide for methods and systems for determining whether a reference point in a location system has changed using estimated channel impulse responses and the entropy of the channel impulse responses.

A first aspect of the present invention provides a method of determining whether the location of a first one of a plurality of reference points used in a wireless location system has changed, the reference points each having a known initial position, the method including the steps of: estimating a channel impulse response of a wireless channel between the first reference point and a second of said plurality of reference points; determining the difference between the estimated channel impulse response and a previously-estimated channel impulse response of the wireless channel; estimating an entropy of the difference between the channel impulse responses; and determining, from said comparison, whether the location of the first reference point has changed.

The location of the first reference point may be determined to have changed if the entropy of the difference between the channel impulse responses is greater than a predetermined threshold. This can allow a tolerance to account for measurement residuals caused by the environment and natural variations, for example due to NLOS and multipath propagation errors.

A second aspect of the present invention provides a method of determining whether the location of a first one of a plurality of reference points used in a wireless location system has changed, the reference points each having a known initial position, the method including the steps of: estimating an entropy of the channel impulse response of a wireless channel between the first reference point and a second of said plurality of reference points; comparing the estimated entropy to a previously-estimated entropy for the channel impulse response of the wireless channel; determining, from said comparison, whether the location of the first reference point has changed.

The location of the first reference point may be determined to have changed if the difference between the estimated entropy and the previously-estimated entropy is greater than a predetermined threshold. This can allow a tolerance to account for measurement residuals caused by the environment and natural variations, for example due to NLOS and multipath propagation errors.

Thus the methods of these aspects can provide an approach validating the location of the reference points used in the location system. These reference points may be wireless access points.

The methods can be performed periodically (whilst the location system is operational), for example, once per day and at system startup.

The method is agnostic to the type of wireless localization technique and is applicable to a wide range of localization systems (RSS, AOA, TOA, TDOA, fingerprinting, etc.). It is not limited to time-based localization systems such as TOA and TDOA for which accurate clock synchronization of the reference points is a key and essential requirement.

The provision of a reference point validation scheme may also enable location-based services (such as life-saving services like E911) to operate with high certainty that the reference points locations are not a source of errors in location estimates.

The methods can use a validity metric for validating the location of reference points based on the estimated entropy of the difference between channel impulse responses or on the difference in the estimated entropy of the channel impulse responses. This validity metric can be used to check if a reference point has accidentally been moved in the location system. Reference points that are found to have invalid locations are not used in the subsequent estimation of client locations in the location system.

Although the methods are applicable in respect of WiFi APs, they are equally applicable to small-form factor small cell base stations used in a localization context.

Entropy is a measure of the uncertainty or unpredictability associated with a signal and the concepts can be adapted to develop suitable metrics for validation of the location of the reference points.

The previously-estimated entropy or the previously-estimated channel impulse response may be determined when the reference points are at their initial positions. This can provide a baseline of entropy or channel impulse response which reflects the environment around the reference point(s) and/or natural variations in the sending and receipt of signals.

The estimation of the channel impulse response may use a discrete-time channel impulse response model. In such a model, the time axis may be quantized into small fixed time intervals called "bins" where each bin is assumed to contain either one multipath component, or no multipath component. Each impulse response can be described by a sequence of 0s and 1s (a path indicator sequence), where a 1 indicates presence of a path in a given bin and a 0 represents absence of a path in that bin. Also each 1 can be associated with an amplitude and a phase value.

The entropy may be estimated using a probability density function (PDF). The estimation may be performed using an autoregressive model and/or by use of a recursive approach.

Preferably the steps are performed with a plurality of the reference points as the first reference point so that the location of each reference point can be checked. When doing so, the same reference point can be used as the second reference point for each of the plurality of reference points as the first reference point.

A third aspect of the present invention provides a method of determining the location of a mobile device, the method including the mobile device exchanging wireless messages with a plurality of reference points having known initial positions and determining the location of the mobile device from the timing of the sending and receiving of said messages, wherein the method further includes determining whether the location of any of the reference points has changed using a method according to either of the above aspects, including some, all or none, of the optional and preferred features of those aspects.

Preferably, when determining the location of the mobile device, the method does not use any reference point whose location is determined to have changed. This means that the determined location of the mobile device can be prevented from being influenced by reference points that are determined to have moved from their initial position and errors in the determined location can be reduced or avoided.

The methods of all of the above aspects may include any combination of some, all or none of the above described preferred and optional features.

The method of the above aspects is preferably implemented by systems according to the fourth and fifth aspects of this invention, as described below, but need not be.

Further aspects of the present invention include computer programs for running on computer systems which carry out the method of the above aspect, including some, all or none of the preferred and optional features of that aspect.

A fourth aspect of the present invention provides a location system having a plurality of reference points each having a known initial position and arranged to exchange wireless messages with a mobile device to determine the location of the mobile device, the system including a processor which is arranged to: estimate a channel impulse response of a wireless channel between the first reference point and a second of said plurality of reference points; determine the difference between the estimated channel impulse response and a previously-estimated channel impulse response of the wireless channel; estimate an entropy of the difference between the channel impulse responses; and determine, from said comparison, whether the location of the first reference point has changed.

The processor may be arranged to determine that the location of the first reference point has changed if the entropy of the difference between the channel impulse responses is greater than a predetermined threshold. This can allow a tolerance to account for measurement residuals caused by the environment and natural variations, for example due to NLOS and multipath propagation errors.

A fifth aspect of the present invention provides a location system having a plurality of reference points each having a known initial position and arranged to exchange wireless messages with a mobile device to determine the location of the mobile device, the system including a processor which is arranged to: estimate an entropy of the channel impulse response of a wireless channel between the first reference point and a second of said plurality of reference points; compare the estimated entropy to a previously-estimated entropy for the channel impulse response of the wireless channel; determine, from said comparison, whether the location of the first reference point has changed.

The processor may be arranged to determine that the location of the first reference point has changed if the difference between the estimated entropy and the previously-estimated entropy is greater than a predetermined threshold. This can allow a tolerance to account for measurement residuals caused by the environment and natural variations, for example due to NLOS and multipath propagation errors.

Thus the location system of these aspects can validate the location of the reference points used in the location system. These reference points may be wireless access points.

The validation can be performed periodically (whilst the location system is operational), for example, once per day and at system startup.

The technique is agnostic to the type of wireless localization technique and is applicable to a wide range of localization systems (RSS, AOA, TOA, TDOA, fingerprinting, etc.). It is not limited to time-based localization systems such as TOA and TDOA for which accurate clock synchronization of the reference points is a key and essential requirement.

The provision of a reference point validation scheme may also enable location-based services (such as life-saving services like E911) to operate with high certainty that the reference points locations are not a source of errors in location estimates.

The location systems can use a validity metric for validating the location of reference points based on the estimated entropy of the difference between channel impulse responses or on the difference in the estimated entropy of the channel impulse responses. This validity metric can be used to check if a reference point has accidentally been moved in the location system. Reference points that are found to have invalid locations are not used in the subsequent estimation of client locations in the location system.

The reference points in the location system may be WiFi APs, but could also be other reference points such as small-form factor small cell base stations used in a localization context.

Entropy is a measure of the uncertainty or unpredictability associated with a signal and the concepts can be adapted to develop suitable metrics for validation of the location of the reference points.

The previously-estimated entropy or the previously-estimated channel impulse response may be determined when the reference points are at their initial positions. This can provide a baseline of entropy or channel impulse response which reflects the environment around the reference point(s) and/or natural variations in the sending and receipt of signals.

In estimating of the channel impulse response the processor may use a discrete-time channel impulse response model. In such a model, the time axis may be quantized into small fixed time intervals called "bins" where each bin is assumed to contain either one multipath component, or no multipath component. Each impulse response can be described by a sequence of 0s and 1s (a path indicator sequence), where a 1 indicates presence of a path in a given bin and a 0 represents absence of a path in that bin. Also each 1 can be associated with an amplitude and a phase value.

The entropy may be estimated using a probability density function (PDF). The estimation may be performed using an autoregressive model and/or by use of a recursive approach.

The processor may be arranged to carry out the steps of estimating, comparing and determining with a plurality of the reference points as the first reference point so that the location of each reference point can be checked. When doing so, the same reference point can be used as the second reference point for each of the plurality of reference points as the first reference point.

In particular embodiments, one of the reference points in the location system may have a position which is guaranteed to be known at all times. This reference point may be known as an anchor reference point. The positions of all the other reference points may be estimated relative to this anchor reference point and this reference point can be used as the second reference point against which the position of each of the other plurality of reference points is checked.

The system may be arranged such that reference points that are found to have invalid locations are not used in the subsequent estimation or determination of client locations in the location system. Thus the accuracy of the system can be improved.

The location system may have a single processor which is arranged to determine whether the location of any of said plurality of reference points have changed by performing the steps of estimating, comparing and determining for each of said plurality of reference points.

The single processor may be located in one of the reference points or in a dedicated (but separate) location management station.

Alternatively or additionally each reference point may have a processor which is arranged to determine whether the location of that reference point has changed.

The systems of the above fourth and fifth aspects may include any combination of some, all or none of the above described preferred and optional features.

Reference Point Location Validation Architecture

Embodiments of the present invention will be described which provide a technique based on the entropy estimate of the channel impulse response (CIR) that can be used to validate the positions of reference points (such as APs in a WiFi networking context).

Simply for the purposes of illustrating these embodiments and demonstrating the principles involved, a number of assumptions are made. However, these are without prejudice to the generality of the application of the techniques described.

First, it is assumed that there are N reference APs located at known positions $(x_i, y_i)$, i=1, 2, . . . , N, in a Cartesian coordinate system. This view can easily be extended to the 3-dimensional case without loss of generality. Most importantly, the APs need not be time synchronized to a common reference clock.

It is further assumed that the APs exchange messages and AP to AP messaging, for example, can be done using WiFi beacon frames. In this case, the APs can take turn in sending beacons to other APs. For simplicity, it is assumed that each AP receives messages from all other APs in the system. In reality, practical constraints such as signal reachability between APs, channel allocation, and other issues have to be considered when designing the location system network.

Further, to simplify the architecture of the APs, the AP location validation is done at a centralized location management station. In other words, all information required for the location validation is sent to the location management station for processing. However, it will be appreciated that the functions of the location management station can be incorporated into one or more of the APs themselves.

The validation process according an embodiment of the present invention is split into two phases; an initial system setup phase, and system operations phase.

After setup of the location system and infrastructure and when the AP locations are precisely known and recorded, each AP, $AP_i$, estimates its baseline CIR, $R_{h,ij}$, with respect to $AP_j$ and develops a corresponding entropy estimate from the CIR, $\hat{H}_{R,ij}$.

In the system operations phase when the system is up and running, the location of an AP is checked periodically to determine if it has been accidentally moved from its known/assigned position $(x_i, y_i)$. Periodically, for example, once a day, each AP, $AP_i$, estimates its CIR, $C_{h,ij}$, with respect to $AP_j$ and develops a corresponding entropy estimate of the CIR, $\hat{H}_{C,ij}$.

The entropies $\hat{H}_{R,ij}$ and $\hat{H}_{C,ij}$ are then compared (for example using validity metrics described in more detail below) to determine if any AP has been moved from its desired position.

Any AP that has been accidentally been moved is not used in the subsequent localization of clients until its new location has been verified and updated in the location system records. In addition, the new position has to be accurately determined to avoid introducing errors in the location estimates of clients. Details of two techniques for validating the location of the APs are given in the embodiments below.

The technique outlined above has N×N AP-to-AP ranging, storage, and computational complexity. Furthermore, the issue of AP-to-AP reachability and communication can be a problem in a large location system network where some APs may not be able to communicate with other APs. Channel assignment to the various APs may also be an issue.

To help address these problems, the network can be partitioned into smaller manageable domains, and an anchor AP selected for each domain. Each anchor AP may then be connected to the location management station, either by a wireless or wired connection.

Figure 2:
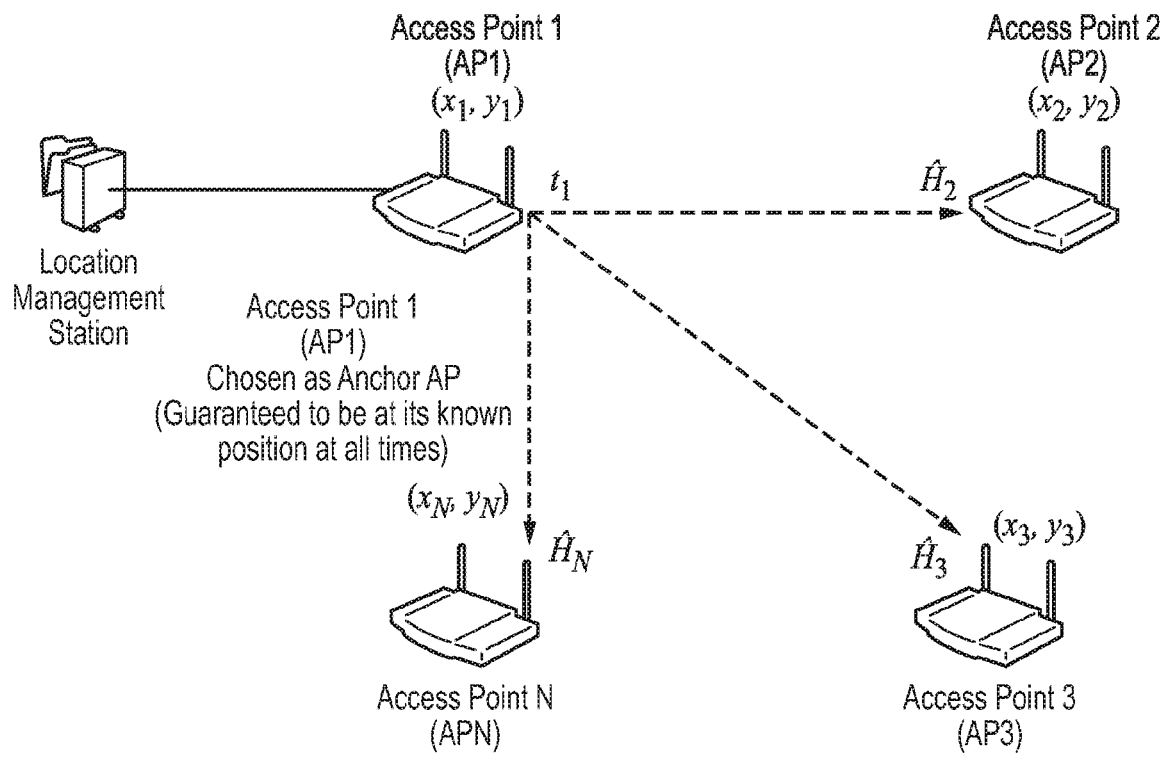
FIG. 2 shows how an anchor access point may be used in a location validation system.

Let us assume that $AP_1$ is selected as the anchor AP for a domain. All other APs, $AP_j$, $j \neq 1$, perform ranging to this anchor AP, $AP_1$ (FIG. 2). The anchor AP is an AP that is guaranteed to be at its known location at all times the location system is operational. By selecting an anchor AP, the complexity of the location system can be greatly reduced. The APs within the domain of the anchor AP must be able to communicate with it. There can be one or more domains in a location system network, each assigned an anchor AP Multipath Propagation A radio signal spreads out in different directions as it radiates away from the broadcast antenna. Multipath occurs when a signal takes two or more paths from the transmitting antenna to the receiving antenna. It is assumed that one signal, the direct ray, travels directly from the transmitter to the receiver. The direct ray is usually (but not always) the strongest signal present in the receiving antenna. The other signals (or rays) arrive at the receiving antenna via more lengthy paths. These reflected signals eventually find their way to the receiving antenna. In the analysis below, it is assumed these indirect rays arrive after the direct ray and that the indirect rays are weaker in power than the direct ray (if it exists).

The propagation of radio waves inside a building is a highly complex process. In a typical indoor environment where a fixed transmitter communicates with a number of receivers the transmitted signal most often reaches the receiver by more than one path because of the reflection, refraction and scattering of the radio waves by structures within the building, resulting in a phenomenon known as multipath fading. The signal components travel over the direct path (if one exists) and indirect paths and arrive and combine at the receiver to produce a distorted version of the transmitted signal.

In narrowband transmission, the multipath fading causes fluctuations in the received signal envelope and phase. In wideband pulse transmission, on the other hand, the effect of multipath fading at the receiver is that it produces a series of delayed and attenuated pulses (echoes) for each transmitted pulse. In addition to the effects of multipath fading, the received signal is often further corrupted by other unwanted random perturbations such as noise and co-channel interference. It should be noted that both digital and analog transmissions suffer from attenuations caused by the intervening structures within the transmission environment.

Figure 3:
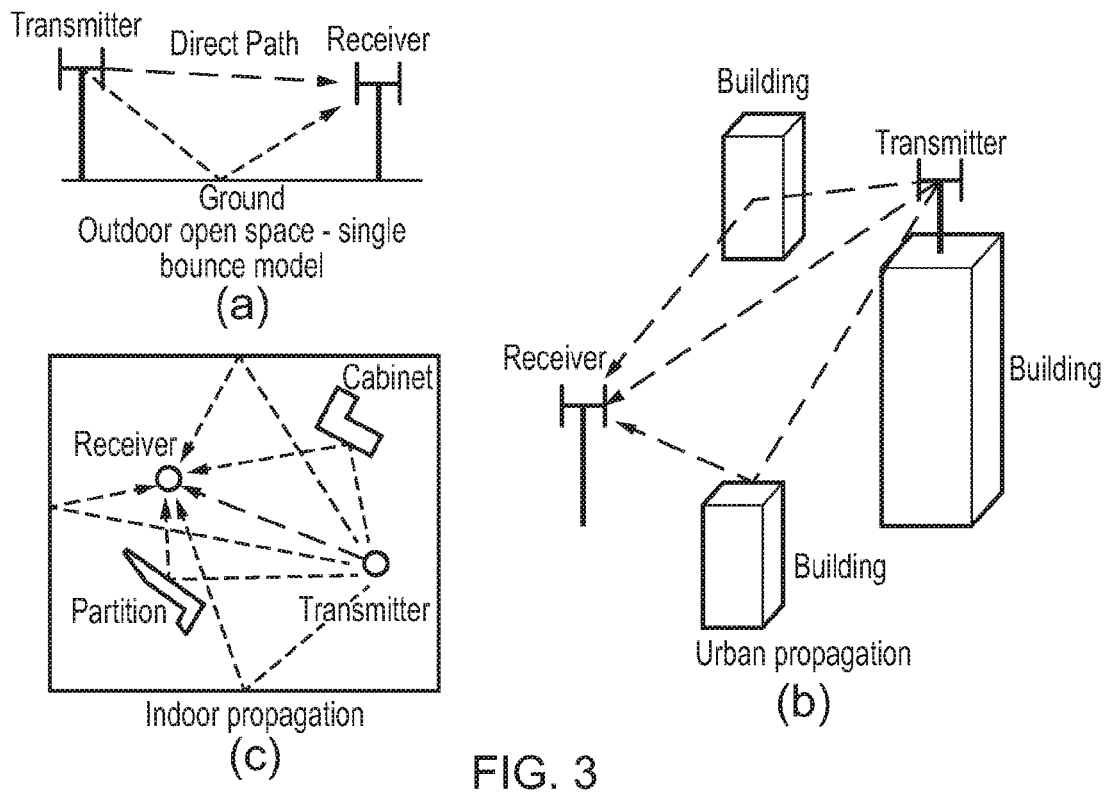
FIG. 3 illustrates how a range of multipath channels that may exist in a variety of environments.

The effects of multipath transmission in various environments are shown in FIG. 3.

Multipath propagation occurs, for example, in indoor propagation, where the electromagnetic waves are perturbed by structures inside the building, and in terrestrial mobile radio, where multipath is caused by large fixed or moving objects (buildings, hills, cars, etc.). As illustrated in FIG. 3, and taking the indoor environment, for example, the signal transmitted leaving the transmitter reaches the receiver via one or more main waves. These main waves consist of a LOS ray and several rays reflected or scattered by structures in the environment such as panels, desks, doors, cabinets, walls, ceilings, floors, etc.

As the signal encounters each of these objects, a reflection occurs. The net channel characteristics arise from the sum of all these individual channels. The intervening structures may attenuate the LOS wave to an extent that makes it undetectable at the receiver. The main waves (NLOS waves) arrive with random delays at the receiver. These (NLOS) waves break up in the radio environment due to scattering by intervening structures.

The direct and reflected waves have different amplitudes (described by $a_k$) and the waves arrive at the receiving antenna at slightly different times (described by $\tau_k$). Some main waves may arrive with very close delays and experience about the same attenuation, but have different phase values due to different path lengths. The individual multipath components are added at the receiver according to their relative arrival times (path delays), amplitudes, and phases, and their random envelope sum is observed by the receiver.

The number of distinguished multipaths manifested in a given transmission environment, and at a given point in space depends on the nature of the intervening structures, and on the resolution, effectiveness and accuracy of the multipath measurement setup. The impulse response profiles (CIR) measured at location i and location j in the transmission environment are normally very different due to differences in the intervening (transmitter to receiver) structures, and differences in the local environment of the receivers (in the case of multiple receivers). The channel characteristics have a great dependence on the size, shape, and construction of the building and the objects within.

The received power in a radio channel is affected by attenuations that are conveniently characterized as a combination of three effects [1]:

1. The "path loss" is the signal attenuation due to the fact that the power received by an antenna at distance D from the transmitter decreases as D increases. Empirically, the power attenuation is proportional to $D^\alpha$, with $\alpha$ an exponent whose typical values range from 2 to 4. In a mobile environment, D varies with time, and consequently so does the path loss. This variation is the slowest among the three attenuation effects here.
2. The "shadowing loss" is due to the absorption of the radiated signal by scattering structures.
3. The "fading loss" occurs as a combination of a number of phenomena, whose combination generates random fluctuations of the received power. These phenomena include multipath propagation and Doppler frequency shift.

The presence of reflectors in the environment surrounding a transmitter and receiver create multiple paths that a transmitted signal can traverse. As a result, the receiver sees the superposition of multiple copies of the transmitted signal, each traversing a different path. Each signal copy will experience differences in attenuation, delay and phase shift while travelling from the source to the receiver. This can result in either constructive or destructive interference, amplifying or attenuating the signal power seen at the receiver.

Channel Estimation and Channel Impulse Response (CIR)

Multipath fading can seriously degrade the performance of communication systems. Since multipath disturbances cannot be eliminated along the transmission medium, the multipath medium can be characterized at the receiver (channel estimation) so that the receiver can be designed to "match" the channel (channel equalization) to reduce the effect of these disturbances. The multipath channel can be viewed as a time-varying filter between the transmitter and receiver that distorts the signal and adaptive equalization techniques can be used to remove it. Multipath equalizers are filters used to mitigate the effects of multipath propagation on the received signal by dynamically adapting to the changing multipath channel.

One method to measure the multipath channel is to observe the output of the demodulator and adaptively make adjustments to the equalizing filter. This is adaptive, decision-based equalization. A second method is to place a known piece of data in the transmitted signal, that is, place a pre-, mid-, or post-amble in the signal at regular intervals. We can then examine the-amble at the receiver and use that data to configure the equalizing filter. As a result, channel estimation and equalization has become a major requirement for the successful design of communication systems. A number of channel estimation techniques for OFDM systems have been proposed and implemented over the years [2].

Bandpass and Baseband Transmission and Channel Models

In a typical wireless communication system, communication takes place in a bandpass $[f_c-W/2, f_c+W/2]$ of bandwidth W and around a center frequency $f_c$, of a spectrum that has been allocated by the telecom regulatory authorities. However, most of the signal processing, such as coding/decoding, modulation/demodulation, synchronization, etc., is done at the baseband level.

At the transmitter, the last stage of the baseband operation is to "up-convert" the signal to the carrier frequency and transmit it via the antenna. Similarly, the first step at the receiver is to "down-convert" the RF (radio-frequency) signal to the baseband before further processing. It is useful to understand a baseband equivalent representation of the system. Therefore, below the baseband equivalent representation of signals is defined.

Consider a real signal s(t) with Fourier transform S(f), band-limited in $[f_c-W/2, f_c+W/2]$ with $W<2f_c$. Its complex baseband equivalent (complex envelope) can be defined as $s_{cb}(t)$, as the signal having Fourier transform [3]:

$$S_{cb}(f) = \begin{cases} \sqrt{2} S(f+f_c), & f+f_c > 0 \\ 0, & f+f_c \leq 0 \end{cases} \quad (1)$$

Figure 4:
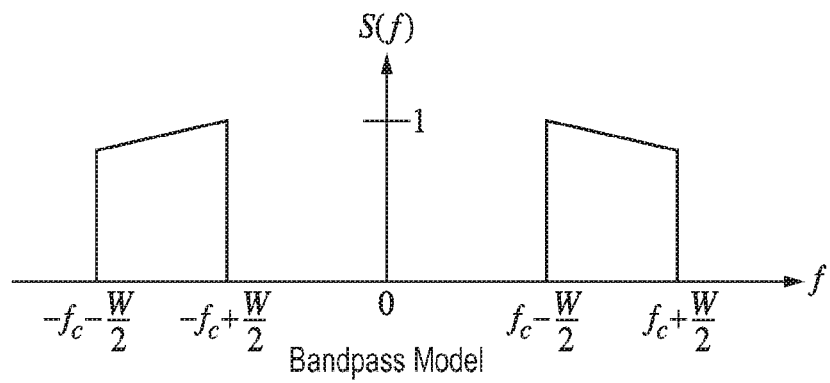
FIG. 4 shows the relationship between bandpass and baseband spectra.
Figure 4:
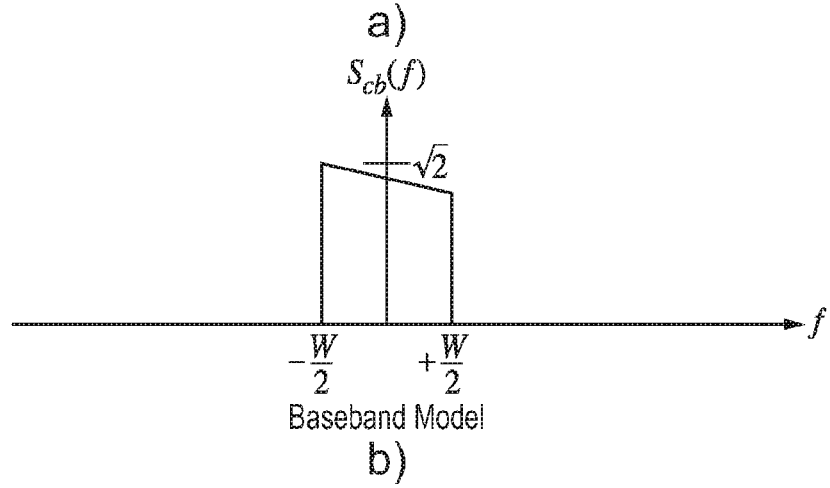

Since s(t) is real, its Fourier transform satisfies $S(f)=S^*(f)$ (that is, Hermitian around f=0), which means that $s_{cb}(t)$ contains exactly the same information as s(t). The factor of $\sqrt{2}$ is quite arbitrary but chosen to normalize the energies of $s_{cb}(t)$ and s(t) to be the same. Note that $s_{cb}(t)$ is band-limited in $[-W/2, W/2]$ as illustrated in FIG. 4, which shows the relationship between the bandpass and baseband spectra.

To reconstruct s(t) from $s_{cb}(t)$, it is observed that [3]

$$\sqrt{2}S(f)=S_{cb}(f-f_c)+S^*_{cb}(-f-f_c) \quad (2)$$

Taking the Fourier transforms, $$s(t) = \frac{1}{\sqrt{2}}\left[s_{cb}(t)e^{j2\pi f_c t} + s^*_{cb}(t)e^{-j2\pi f_c t}\right] = \sqrt{2}\,\text{Re}\left[s_{cb}(t)e^{j2\pi f_c t}\right] \quad (3)$$

Figure 5:
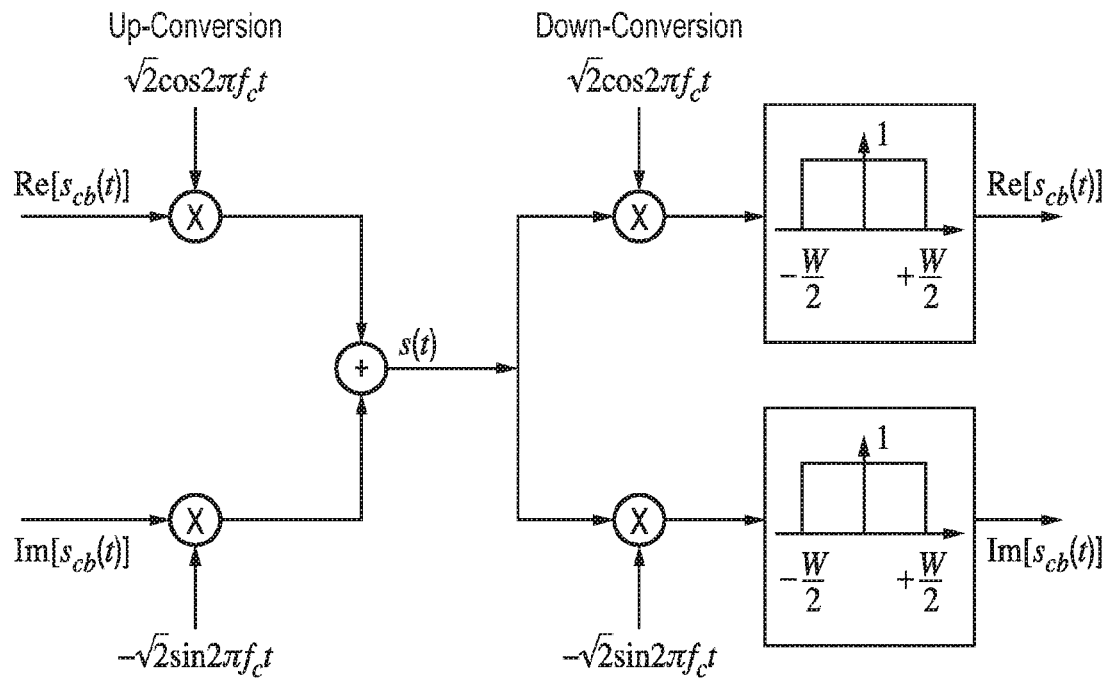
FIG. 5 shows the relationship between the real signal and its complex envelop in an idealised case of the up-conversion and down-conversion of a transmitted signal.

FIG. 5 shows the relationship between the real signal s(t) and its complex envelop $s_{cb}(t)$ for an ideal case. At the transmitter, the bandpass signal s(t) is obtained by modulating Re[$s_{cb}(t)$] by $\sqrt{2} \cos 2\pi f_c t$ and Im[$s_{cb}(t)$] by $-\sqrt{2} \sin 2\pi f_c t$ and these two are summed to get the real signal s(t)=$\sqrt{2}$ Re[$s_{cb}(t)e^{j2\pi f_c t}$] (up-conversion process). At the receiver, the baseband signal Re[$s_{cb}(t)$] (respectively, Im[$s_{cb}(t)$]) is obtained by modulating s(t) by $\sqrt{2} \cos 2\pi f_c t$ (respectively $-\sqrt{2} \sin 2\pi f_c t$) followed by ideal low-pass filtering at the baseband [$-W/2$, $W/2$] (down-conversion process).

Baseband CIR Model

The multipath channel can be fully characterized by its time and space varying impulse response. This means the complicated random and time-varying radio propagation channel can be modelled (for each point in the three-dimensional space) as a linear time-varying filter with an impulse response. The baseband impulse response of a multipath channel can be expressed as [4]:

$$h_b(t, \tau) = \sum_{k=0}^{M(\tau)-1} a_k(t, \tau)\delta[t-\tau_k(t)]\exp\{j[2\pi f_c \tau_k(t) + \phi_k(t, \tau)]\} \quad (4)$$

where t and $\tau$ are the observation time and application time of the impulse, respectively, $M(\tau)$ is the number of multipath components, $\{a_k(t, \tau)\}$, $\{\tau_k(t)\}$, $\{\theta_k(t)\}$ are the random time-varying amplitude, path delays, and phase sequences, respectively, and $\delta$ is the delta function. These path variables completely characterize the multipath channel. The variables $a_k(t, \tau)$ and $\tau_k(t)$ are the real amplitudes (path gains) and propagation delays, respectively, of the kth multipath component at time t. The received signal in a multipath channel consists of a series of attenuated, time-delayed, phase shifted replicas of the transmitted signal. The variable $h_b(t, \tau)$ is the baseband channel response at time t to a unit impulse $\delta(\cdot)$ transmitted at time $t-\tau$.

The phase term $2\pi f_c \tau_k(t)+\phi_k(t, \tau)$ in the expression above represents the phase shift due to free space propagation of the kth multipath component, plus any additional phase shifts which are encountered in the channel. In general, the phase term is simply represented by a single variable $\theta_k(t, \tau)$ which lumps together all the mechanisms for phase shifts of a single multipath component within the kth excess delay bin. The expression for $h_b(t, \tau)$ then simplifies to $$h_b(t, \tau) = \sum_{k=0}^{M(\tau)-1} a_k(t, \tau)\delta[t-\tau_k(t)]e^{j\theta_k(t,\tau)} \quad (5)$$

Figure 6:
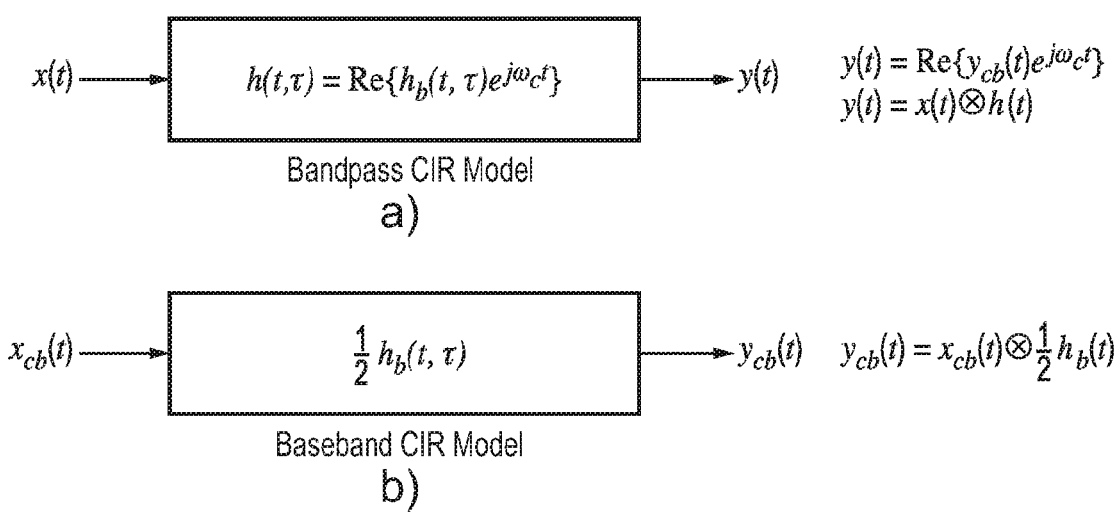
FIG. 6 illustrates bandpass and baseband CIR models.

The studies in [4] were the first to determine that a multipath channel can be modelled as a time-varying linear system with low-pass equivalent impulse response $h_b(t, \tau)$. This model is a wideband model which has the advantage that it is general and can be used to obtain the impulse response of a radio channel (see FIG. 6). The factor of ½ in FIG. 6 is due to the properties of the complex envelope used to represent the bandpass radio channel at baseband level [5].

Note that $h(t, \tau)=\text{Re}\{h_b(t, \tau) \exp[j\omega_c t]\}$, that is, the real part of the baseband CIR.

If the channel impulse response is assumed to be time invariant, or is at least wide sense stationary over a small-scale time or distance interval, then the channel impulse response may be simplified (as the stationary time-invariant channel):

$$h_b(t) = h_b(\tau) = \sum_{k=0}^{M-1} a_k \delta[t - \tau_k] e^{j\theta_k} = \sum_{k=0}^{M-1} a_{b,k} \delta[t - \tau_k] \quad (6)$$

where $a_{b,k} = a_k e^{j\theta_k}$. If the channel is time invariant, then $h_b(t, \tau)$ is a constant function of t.

If the multipath channel is assumed to be a bandlimited bandpass channel, which is reasonable for real applications, then the CIR, h(t, $\tau$), may be equivalently described by a complex baseband impulse response, $h_b(t, \tau)$, with the input $x_{cb}(t)$ and output $y_{cb}(t)$ being the complex envelope representations of the transmitted x(t) and received y(t) signals, respectively. With this model, if the signal $x(t) = \text{Re}\{x_{cb}(t) \exp[j\omega_c t]\}$ (while dropping the factor of $\sqrt{2}$) is transmitted through this stationary time-invariant channel environment (where $x_{cb}(t)$ is any low-pass signal and co, is the carrier frequency), the signal $y(t) = \text{Re}\{y_{cb}(t) \exp[j\omega_c t]\}$ is received where $$y_{cb}(t) = \sum_{k=0}^{M-1} a_k x_{cb}(t - \tau_k) e^{j\theta_k} = \sum_{k=0}^{M-1} a_{b,k} x_{cb}(t - \tau_k) \quad (7)$$

Here, $x_{cb}(t)$ and $y_{cb}(t)$ are the complex envelopes of x(t) and y(t), respectively.

Figure 7:
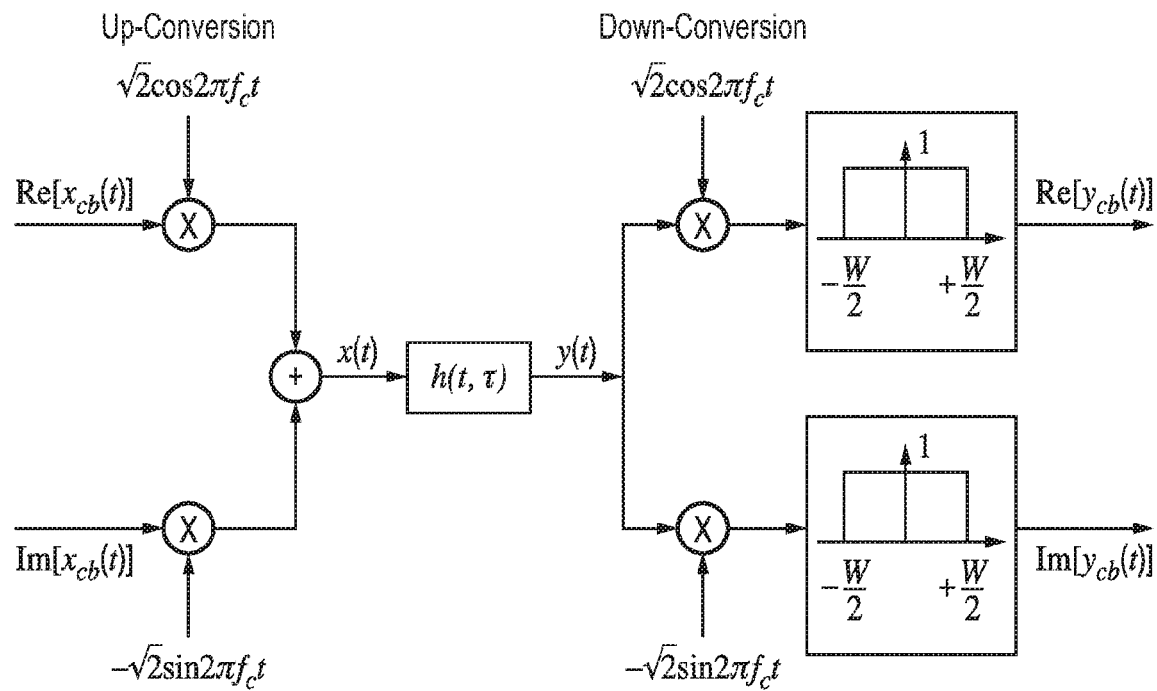
FIG. 7 shows a quadrature amplitude modulation (QAM) conversion of an input signal to an output signal in an ideal case.

FIG. 7 shows the system diagram for converting $x_{cb}(t)$ to $y_{cb}(t)$ in an ideal case. This implementation of a bandpass communication system is known as quadrature amplitude modulation (QAM). The signal $\text{Re}[x_{cb}(t)]$ is sometimes called the in-phase component, I, and $\text{Im}[x_{cb}(t)]$ the quadrature component, Q, (rotated by $\pi/2$).

Figure 8:
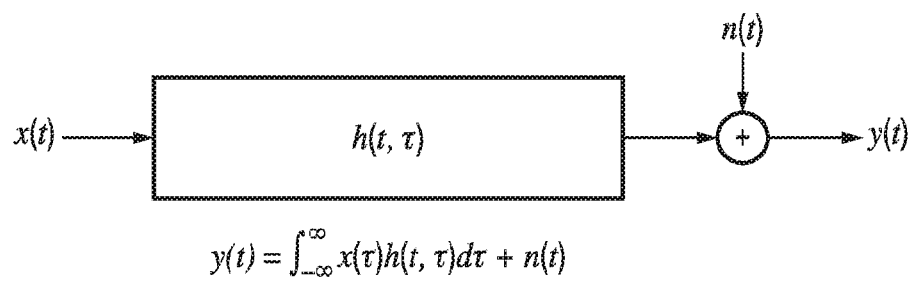
FIG. 8 illustrates the mathematical model of a multipath medium.
Figure 9:
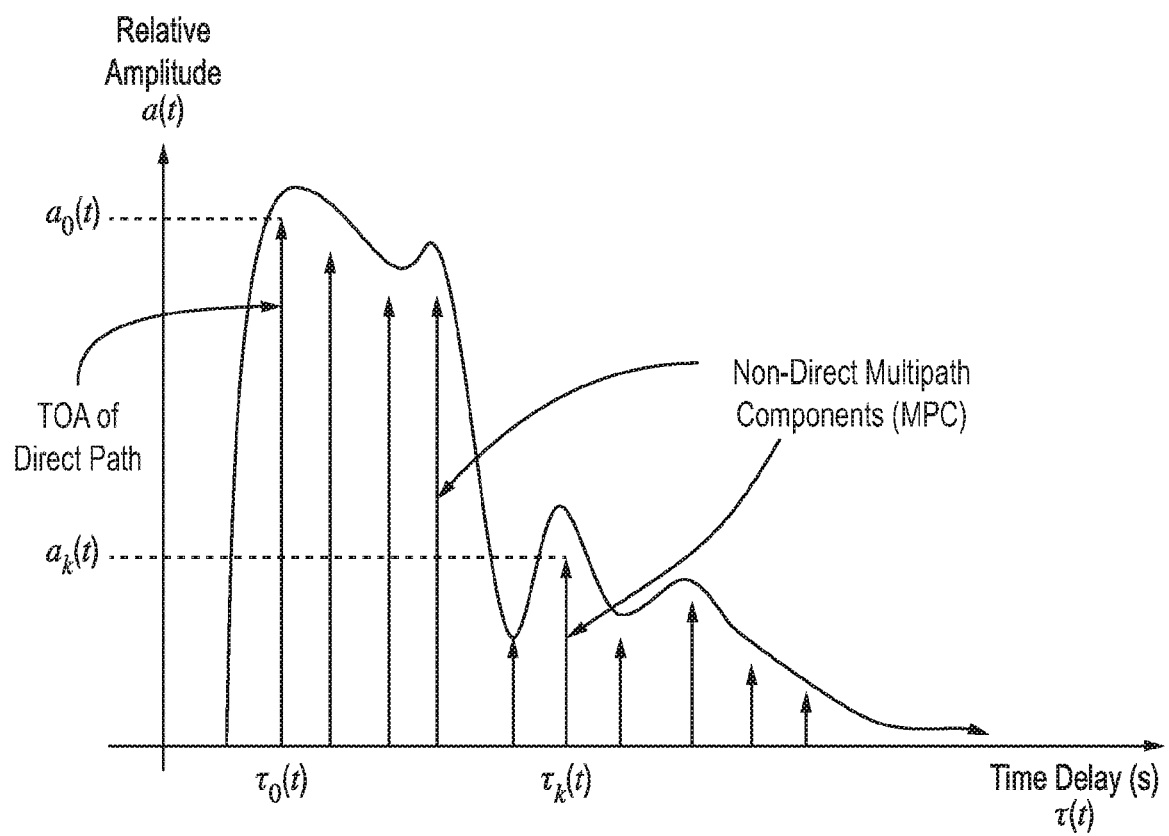
FIG. 9 illustrates the CIR of a multipath medium.

This CIR model, used to describe multipath fading channels, has been applied successfully in mobile radio systems and applications. This mathematical model is illustrated in FIG. 8. The CIR of a multipath medium is illustrated in FIG. 9. The output y(t) of the channel to a transmitted signal x(t) is therefore given by $$y(t) = \int_{-\infty}^{\infty} x(\tau) h(t-\tau) d\tau + n(t) \quad (8)$$

where n(t) is the low-pass complex-valued additive Gaussian noise. The transmission of any transmitted signal x(t) gives a received signal y(t) that is found by convolving x(t) with h(t, $\tau$) and adding noise n(t).

In a real transmission situation where a mobile receiver is moving through a channel experiencing a space-varying fading phenomenon, an impulse response "profile" can be associated with each point in space. However, it should be noted that profiles corresponding to points close in space are expected to be very similar because the principle structures that reflect and scatter the transmitted signal, give rise to the multipaths that remain approximately the same over short distances.

The sequence of arrival times $\{t_k\}_0^\infty$ of the paths at the receiver forms a point process on the positive time axis. In a multipath environment if the difference in time delay of a number of path is much less than the reciprocal of the transmission bandwidth, the paths cannot be resolved as distinct pulses. These unresolvable subpaths (with time delays denoted by $t_{k,i}$, i=1, 2, . . . , n) add up (vectorially according to their relative strengths and phases) to give an envelope (which consists of their sum) that is observed, and with the envelope value being a random variable. If $t_{k,i} - t_{k,j} < 1/W$, j=1, 2, . . . , n, where n is the number of subpaths and W is the transmission bandwidth, then the resolved multipath component becomes $$a_k e^{j\theta_k} = \sum_{i=1}^{n} a_{k,i} e^{j\theta_{k,i}} \quad (9)$$

When a strong path exists in addition to the low level scattered paths, this strong component may be a LOS path or a path that goes through much less attenuation compared to other arriving components. When such a strong path exists, the received signal vector can be considered to be the sum of this path and all the scattered paths with random amplitude and phase.

Other Multipath Channel Parameters

The received signal in a radio channel is affected by attenuations that can be conveniently characterized by a number of parameters, some of which are discussed in this section.

Doppler Effect

When the receiver and the transmitter are in relative motion with constant radial speed, v, the received signal is subject to a constant frequency shift, $f_D$, (the Doppler shift) proportional to this speed and to the carrier frequency, $f_c$. Let us assume the transmitter transmits an unmodulated carrier with frequency $f_c$ and $\gamma$ is the angle between the direction of propagation of the electromagnetic plane wave and the direction of motion. The Doppler effect causes the received signal to be a tone whose frequency is displaced by an amount (the Doppler frequency shift), $$f_D = f_c \frac{v}{c} \cos \gamma \quad (10)$$

where c is the speed of propagation of the electromagnetic field in the medium. When the receiver (or reflectors in its environment) is moving, the receiver's velocity causes a shift in the frequency of the signal transmitted along each signal path.

Notice that the Doppler frequency shift is either greater or lower than 0, depending on whether the transmitter is moving toward the receiver or away from it (this is reflected by the sign of cos $\gamma$). Note that variations of v would cause a time-varying $f_D$. When the angle $\gamma = 0$, the Doppler frequency shift is given as $$f_D = f_c \frac{v}{c} \quad (11)$$

Consider now the transmission of a bandpass signal x(t), that experiences attenuation $\alpha(t)$ and delay $\tau(t)$ (and ignoring for now multipaths). The complex envelope of the received signal is [1]

$$y_c(t) = \alpha(t) e^{j\theta(t)} x_c(t - \tau(t)) \quad (12)$$

where $$\theta(t) = 2\pi[(f_c + f_D)\tau(t) - f_D t] \quad (13)$$

This channel can be modelled as a time-varying linear system with low-pass equivalent impulse response $$h(t, \tau) = 2\alpha(t) e^{j\theta(t)} \delta[t - \tau(t)] \quad (14)$$

Fading loss occurs as a combination of a number of phenomena, whose combination generates random fluctuations of the received power. These phenomena include multipath propagation, shadowing from obstacles affecting the wave propagation, sometimes referred to as shadow fading, and Doppler frequency shift. In general, the term fading describes the variations with time of the received signal strength. Fading, due to the combined effects of multipath propagation and of relative motion between transmitter and receiver, generates time-varying attenuations and delays that may significantly degrade the performance of a communication system. With multipath and motion, the signal components arriving from the various paths with different delays combine to produce a distorted version of the transmitted signal.

Multipath Propagation and the Effect of Movement

Assume that the transmitted signal (an unmodulated carrier as above) is received through M paths. Let the receiver be in motion with velocity v, and let $a_i$, $\theta_i$, and $\gamma_i$ denote the amplitude, the phase, and the angle of incidence of the ray from the ith path, respectively. The received signal contains contributions with a variety of Doppler shifts and in the ith path the carrier frequency $f_c$ is shifted by $$f_{D,i} = f_c \frac{v}{c} \cos \gamma_i, \; i = 0, 1, \ldots, M-1 \tag{15}$$

Signals traveling along different paths can have different Doppler shifts, corresponding to different rates of change in phase.

When a single unmodulated carrier (constant envelope) is transmitted in a multipath environment, due to vector addition of the individual multipath components, a rapidly fluctuating CW (continuous wave) envelope is experienced by a receiver in motion. To deduce this narrow-band result from the above wide-band model we let x(t) equal to 1. Thus, the (analytic) received signal can be written in the form [1]

$$y(t) = \sum_{i=0}^{M-1} a_i \exp j[2\pi(f_c - f_{D,i})t + \theta_i] \tag{16}$$

Excluding noise, the resultant CW envelope R and phase $\omega_c t$ for a single point in space are thus given as follows. The complex envelope of the received signal turns out to be $$R \cdot e^{j2\pi f_c t} = \sum_{i=0}^{M-1} a_i e^{-j(2\pi f_{D,i} t + \theta_i)} \tag{17}$$

Sampling the channel's impulse response frequently enough, one should be able to generate the narrow-band CW fading results for the receiver in motion, using the wideband impulse response model discussed above.

Doppler Spread and Coherence Time of a Channel

A simple yet useful classification of fading channels can be set up on the basis of the definition of two quantities called coherence time and coherence bandwidth of the physical channel. When the receiver and the transmitter are in relative motion with constant radial speed, the Doppler effect, in conjunction with multipath propagation, causes time- and frequency-selective fading.

First, it is observed that significant changes in the attenuations of different paths occur at a rate much lower than significant changes in their phases. If $\tau_i(t)$ denotes the delay in the ith path, the corresponding phase is $2\pi f(t-\tau_i(t))$, which changes by $2\pi$ when $\tau_i(t)$ changes by $1/f_c$, or, equivalently, when the path length changes by $c/f_c$. Now, if the path length changes at velocity $v_i$, this change occurs in a time $c/(f_c v_i)$, the inverse of the Doppler shift in the ith path.

Signals traveling along different paths can have different Doppler shifts, corresponding to different rates of change in phase. The difference in Doppler shifts between different signal components contributing to a signal fading channel tap is known as the Doppler spread. Channels with a large Doppler spread have signal components that are each changing independently in phase over time. Since fading depends on whether signal components add constructively or destructively, such channels have a very short coherence time.

Consequently, significant changes in the channel occur in a time $T_{coh}$, whose order of magnitude is the inverse of the maximum Doppler shift $f_{D,max}$ among the various paths, called the Doppler spread of the channel. Doppler spread is proportional to the velocity of the mobile and to the angular spread of the arriving paths. The time $T_{coh}$ is called the coherence time of the channel, and we have $$T_{coh} = \frac{1}{f_{D,max}} \tag{18}$$

The maximum Doppler spread (also called the maximum Doppler frequency or maximum Doppler shift) and coherence time are inversely proportional to one another. Coherence time is the time duration over which the channel impulse response is considered to be not varying. The coherence time $T_{coh}$ is the time domain dual of Doppler spread and is used to characterize the time varying nature of the frequency dispersiveness of the channel in the time domain.

Coherence time is actually a statistical measure of the time duration over which the channel impulse response is essentially invariant, and quantifies the similarity of the channel response at different times. In other words, coherence time is the time duration over which two received signals have a strong potential for amplitude correlation. If the reciprocal bandwidth of the baseband signal is greater than the coherence time of the channel, then the channel will change during the transmission of the baseband message, thus causing distortion at the receiver.

The significance of $T_{coh}$, is as follows. Let $T_x$ denote the duration of a transmitted signal. Since in digital communications, we consider the coded signal, we may think of $T_x$, as the duration of a code word. If it is so short that during transmission the channel does not change appreciably in its features, then the signal will be received undistorted. Its distortion becomes noticeable when $T_x$ is greater than $T_{coh}$, which can be interpreted as the delay between two time components of the signal beyond which their attenuations become independent [1].

When the signal amplitude at the receiver varies overtime, this is generally called signal fading. This can be split into slow fading and fast fading. This generally means variations in amplitude that change slowly with time (e.g., slowly compared to the transmission frame length). Often engineers think of slow fading as being fading where the system might have time to react in some way, for example using an AGC system. Fast fading is signal variation that is considered too rapid for the system to follow. Rain fading is an example of slow fading—with time variability measured in seconds and minutes. Mobile operators tend to consider shadowing by buildings as slow fading, periods of seconds while passing buildings. Fast fading generally means variations in the signal amplitude that change rapidly with time, e.g., times of the order of a packet, or even a symbol. Fast fading typically varies about a mean value and often fast fading is superimposed on slow fading. Multipath can cause fast fading in mobile systems.

Thus, the terms slow and fast fading refer to the rate at which the magnitude and phase change imposed by the channel on the signal changes. The coherence time is a measure of the minimum time required for the magnitude change or phase change of the channel to become uncorrelated from its previous value.

Slow Fading: Slow fading arises when the coherence time of the channel $T_{coh}$ is large relative to the delay requirement of the application (i.e., $T_{coh}$>>delay requirement). In this regime, the amplitude and phase change imposed by the channel can be considered roughly constant over the period of use. Slow fading can be caused by events such as shadowing, where a large obstruction such as a hill or large building obscures the main signal path between the transmitter and the receiver. If $T_{coh}$>>$T_x$, there is no time-selective fading, and the channel is called flat (or nonselective) in time, that is, we have a time-flat (slow) fading channel [3].

Fast Fading: Fast fading occurs when the coherence time of the channel $T_{coh}$ is small relative to the delay requirement of the application (i.e., $T_{coh}$<<delay requirement). In this case, the amplitude and phase change imposed by the channel varies considerably over the period of use. We say the channel is time-selective if $$T_{coh} \lesssim T_x,$$

that is, we have a time-selective (fast) fading channel [3].

The operational significance of this definition is that, in a fast fading channel, one can transmit the coded symbols over multiple fades of the channel, while in a slow fading channel, one cannot. Thus, whether a channel is fast or slow fading depends not only on the environment but also on the application; voice, for example, typically has a short delay requirement of less than 100 ms, while some types of data applications can have a laxer delay requirement [3].

Strong destructive interference is frequently referred to as a deep fade and may result in temporary failure of communication due to a severe drop in the channel signal-to-noise ratio. In a fast-fading channel, the transmitter may take advantage of the variations in the channel conditions using time diversity to help increase robustness of the communication to a temporary deep fade. Although a deep fade may temporarily erase some of the information transmitted, use of an error-correcting code coupled with successfully transmitted bits during other time instances (interleaving) can allow for the erased bits to be recovered. In a slow-fading channel, it is not possible to use time diversity because the transmitter sees only a single realization of the channel within its delay constraint. A deep fade therefore lasts the entire duration of transmission and cannot be mitigated using coding.

Delay Spread and Coherence Bandwidth of a Channel

Another important general parameter of a wireless system is the multipath delay spread, $T_{ds}$, defined as the difference in propagation time between the longest and shortest path, counting only the paths with significant energy. Thus, $$T_{ds} = \max_{i,j} |\tau_i(t) - \tau_j(t)| \tag{19}$$

Delay spread is proportional to the difference between the lengths of the shortest and the longest paths. It can be interpreted as the difference between the time of arrival of the earliest significant multipath component (typically the line-of-sight component) and the time of arrival of the latest multipath components. The delay spread is a measure of the multipath richness of a communications channel. Delay spread can be quantified through different metrics, although the most common one is the root mean square (RMS) delay spread (see discussion).

The importance of delay spread is how it affects the Inter-Symbol Interference (ISI). If the symbol duration is long enough compared to the delay spread (typically 10 times as big would be good enough), one can expect an equivalent ISI-free channel. The corresponding measure in the frequency domain is the notion of coherence bandwidth, which is the bandwidth over which the channel can be assumed flat (see discussion below).

The delay spread of the channel dictates its frequency coherence. Wireless channels change both in time and frequency. The time coherence shows how quickly the channel changes in time, and similarly, the frequency coherence shows how quickly it changes in frequency. The quantity that is dual to the delay spread, called coherence bandwidth, shows how rapidly the channel changes in frequency.

Consider paths i and j and the phase difference between them, i.e., $2\pi f(\tau_i(t)-\tau_j(t))$, a differential phase. This changes significantly when f changes by an amount proportional to the inverse of the difference $\tau_i(t)-\tau_j(t)$. This differential phase $2\pi f(\tau_i(t)-\tau_j(t))$ causes selective fading in frequency. If $T_{ds}$, called the delay spread of the channel, denotes the maximum among these differences, a significant change occurs when the frequency change exceeds the inverse of $T_{ds}$. Coherence bandwidth is related to the inverse of the delay spread and is defined as $$W_{coh} = \frac{1}{T_{ds}} \tag{20}$$

This relationship is intended as an order of magnitude relation, essentially pointing out that the coherence bandwidth is reciprocal to the multipath spread. The shorter the delay spread, the larger is the coherence bandwidth. Coherence bandwidth $W_{coh}$ is a statistical measure of the range of frequencies over which the channel can be considered "flat", or in other words the approximate maximum bandwidth or frequency interval over which two frequencies of a signal are likely to experience comparable or correlated amplitude fading.

It can be reasonably assumed that the channel is flat if the coherence bandwidth $W_{coh}$ is greater than the data signal bandwidth W. Frequencies within a coherence bandwidth of one another tend to all fade in a similar or correlated fashion. The portion of the signal bandwidth over which fading does not occur typically contains enough signal power to sustain reliable communications. This is the bandwidth over which the channel transfer function remains virtually constant.

Thus, the coherence bandwidth measures the signal bandwidth beyond which the frequency distortion of the transmitted signal becomes relevant. In other words, the coherence bandwidth is the frequency separation at which two frequency components of the signal undergo independent attenuations. The constructive and destructive interference pattern does not change appreciably if the frequency changes by an amount much smaller than $1/T_{ds}$ which is the coherence bandwidth.

Selective Fading

Selective fading or frequency selective fading is a radio propagation anomaly caused by partial cancellation of a radio signal by itself. The signal arrives at the receiver by two different paths, and at least one of the paths is changing (lengthening or shortening). As the carrier frequency of a signal is varied, the magnitude of the change in amplitude will vary. The coherence bandwidth measures the separation in frequency after which two signals will experience uncorrelated fading.

Flat Fading: In flat fading, the coherence bandwidth of the channel is much larger than the bandwidth of the signal (i.e., $W_{coh} \gg W$). Therefore, all frequency components of the signal will experience the same magnitude of fading. If $W_{coh} \gg W$, there is no frequency-selective fading and hence no time dispersion. The channel transfer function looks constant, and the channel is called flat (or nonselective) in frequency.

Frequency-Selective Fading: In frequency-selective fading, the coherence bandwidth of the channel is considerably smaller than the bandwidth of the signal (i.e., $W_{coh} \ll W$). Different frequency components of the signal therefore experience uncorrelated fading. The term frequency-selective fading expresses this lack of correlation among different frequency components of the transmitted signal. Note that flat or frequency-selective fading is not a property of the channel alone, but of the relationship between the bandwidth W and the coherence bandwidth $W_{coh}$.

Since different frequency components of the signal are affected independently, it is highly unlikely that all parts of the signal will be simultaneously affected by a deep fade. Certain modulation schemes such as orthogonal frequency-division multiplexing (OFDM) and code division multiple access (CDMA) are well-suited to employing frequency diversity to provide robustness to fading. OFDM divides the wideband signal into many slowly-modulated narrowband subcarriers, each exposed to flat fading rather than frequency selective fading. This can be combated by means of error coding, simple equalization or adaptive bit loading. Inter-symbol interference is avoided by introducing a guard interval between the symbols. CDMA uses the rake receiver to deal with each echo separately.

Frequency-selective fading channels are also dispersive, in that the signal energy associated with each symbol is spread out in time. This causes transmitted symbols that are adjacent in time to interfere with each other. Equalizers are often deployed in such channels to compensate for the effects of the inter-symbol interference.

The echoes may also be exposed to Doppler shift, resulting in a time varying channel model.

The effect can be counteracted by applying some diversity scheme, for example OFDM (with subcarrier interleaving and forward error correction), or by using two receivers with separate antennas spaced a quarter-wavelength apart, or a specially designed diversity receiver with two antennas. Such a receiver continuously compares the signals arriving at the two antennas and presents the better signal.

Other Classifications of Fading Channels

The discussion above identifies two quantities: $W_{coh}$ and $T_{coh}$ which describe how the channel behaves for the transmitted signal [1].

Underspread Versus Overspread Channel

The product $T_{ds}f_{D,max}=1/(T_{coh}W_{coh})$ is called the spread factor of the channel [1]. If $T_{ds}f_{D,max}<1$, the channel is said to be underspread, otherwise, it is overspread [1]. Generally, if the spread factor $T_{ds}f_{D,max} \ll 1$, the channel impulse response can be easily measured, and that measurement can be used by the receiver in the demodulation of the received signal and by the transmitter to optimize the transmitted signal. Typical wireless channels are underspread, which means that the delay spread $T_{ds}$ is much smaller than the coherence time $T_{coh}$.

Measurement of the channel impulse response of an overspread channel is extremely difficult and unreliable, if not impossible. Since, in general, signal bandwidth and signal duration are such that $W_x T_x \gg 1$ (as otherwise there would be no hope for reliable communication, even in a non-faded time-invariant channel, as, for example, the AWGN channel), it follows that a slowly fading, frequency nonselective channel is underspread [1].

Ergodic Channel Finally, a channel is said to be ergodic if the signal (i.e., the code word) is long enough to experience essentially all the states of the channel [1]. This situation occurs when $T_x \gg T_{coh}$ Thus, it is possible to discriminate between slow and fast fading and ergodic and nonergodic channels according to the variability of the fading process in terms of the whole code word transmission duration.

Coherence Distance of a Channel

In addition to coherence time and bandwidth, it is sometimes useful to define the coherence distance of a channel in which multiple antennas are used. This is the maximum spatial separation of two antennas over which the channel response can be assumed constant: specifically, the channel is said to be space selective if the separation between antennas is larger than the coherence distance.

Mean Excess Delay and RMS Delay Spread

The excess delay of a multipath channel is the relative delay of the ith multipath component as compared to the first arriving component. Some measures that are commonly used to characterize an impulse response profile are the mean excess delay and RMS delay spread, which are defined, respectively, as [6]:

$$\tau_m = \frac{\sum_k (t_k - t_A)a_k^2}{\sum_k a_k^2} \tag{21}$$

$$\tau_{rms} = \left\{ \frac{\sum_k (t_k - \tau_m - t_A)a_k^2}{\sum_k a_k^2} \right\} \tag{22}$$

where $\tau_A$ is the arrival time of the first path in a profile. The RMS delay spread $\tau_{rms}$ provides a good measure of multipath spread as well as an indication of the potential for ISI (Inter-Symbol Interference) in the transmitted signal. Strong paths (relative to the LOS path) with long delays tend to contribute significantly to $\tau_{rms}$. The mean excess delay $\tau_m$, is equivalent to the first moment of the power delay profile ($|h(t)|^2$) with respect to the first arriving path, while the RMS delay spread $\tau_{rms}$ is the square root of the second central moment of a power delay profile. The performance of communication systems operating in a multipath environment are very sensitive to the value of $\tau_{rms}$. The RMS delay spread $\tau_{rms}$ is a measure of signal dispersion in the channel.

Common Techniques for Mitigating Signal Fading

Fading can cause poor performance in a communication system because it can result in a loss of signal power without reducing the power of the noise. This signal loss can be over some or all of the signal bandwidth. Fading can also be a problem as it changes over time: communication systems are often designed to adapt to such impairments, but the fading can change faster than the adaptations can be made. In such cases, the probability of experiencing a fade (and associated bit errors as the signal-to-noise ratio drops) on the channel becomes the limiting factor in the link's performance.

The effects of fading can be combated by using diversity to transmit the signal over multiple channels that experience independent fading and coherently combining them at the receiver. The probability of experiencing a fade in this composite channel is then proportional to the probability that all the component channels simultaneously experience a fade, a much more unlikely event.

Diversity can be achieved in time, frequency, or space. Common techniques used to overcome signal fading include:

Diversity reception and transmission
MIMO
OFDM
Rake receivers
Space-time codes
Forward Error Correction
Interleaving Note on Multipath Mitigation Multipath fading does not reduce the average energy of the received signal. The signal energy is redistributed over time and space. If the communications links are designed to be insensitive to this energy redistribution, then the link can approach the theoretical performance of an additive white Gaussian noise (AWGN) channel. Generally, all multipath mitigation techniques use some form of diversity. The transmitter sends sufficient information over two or more statistically separate channels. The receiving antenna collects this energy, and, by careful manipulation, it can recover the transmitter's data. The statistically separate channels can include frequency diversity, time diversity (using data coding and interleaving), and space diversity.

Important Observation about the Multipath Environment

Let $Z_k$, k=1, 2, ..., L, be a random variable representing a single parameter of the radio channel measured at a fixed point in the three-dimensional space. For example, $Z_k$ may represent the amplitude, $a_k$, of a multipath component at a fixed delay in the wideband model of (Eq. 5), the number of detectable multipath components in the impulse response, M of (Eq. 5), or mean excess delay or delay spread, etc. The index k in $Z_k$ indexes the spatially-adjacent points along which the receiver moves (e.g., in 1 to 2 m separation).

The number of multipath components in each impulse response profile, M, can be considered as a random variable. Mean value of M will be different for different types of buildings and even in the same building, the mean value will depend on the nature of the intervening structures with the building. The sequences of path variable $\{a_k\}$, $\{t_k\}$, and $\{\theta_k\}$ for every point in space are also random sequences. The mean and variance of the distribution of $a_k$s are also random variables due to large-scale nonuniformities in the channel over large areas.

In the subsections below, some of the important observations that were obtained from extensive studies carried out in [6] and the references therein are summarised. These observations are general enough and apply to many channel environment types including the typical indoor transmission environment (e.g., office building, factory environments, college and university building, etc.).

Correlations Within a CIR Profile

Generally, amplitude fading in a multipath environment may follow different distributions depending on the area traversed by the radio signal, presence or absence of a dominating strong path component, and some other environmental conditions. However, multiple impulse response profiles taken in the same "local area" or site tend to be very similar since the channel's structure does not change appreciably over short distances. The impulse responses in the same site exhibit only variations in fine details.

The adjacent multipath components of the same CIR profile are generally not independent. Adjacent multipath components of the same impulse response profile are likely to be correlated. For example, adjacent amplitudes, $a_k$, within the same CIR profile are likely to have correlated fading (in high resolution measurements) since a number of intervening objects that scatter the radio signal and produce them would most likely be the same. Phase components for the same profile $\theta_k$ however, have been found to be uncorrelated since at frequencies of interest, their relative excess range is much larger than a wavelength.

The amplitude sequence, $\{a_k\}$, and the arrival-time sequence, $\{t_k\}$, have been found to be correlated because later paths of a given profile experience multiple reflections and hence experience higher attenuations. Correlation between the arrival times $\{t_k\}$, if it exists, is due to the grouping property of the local intervening structures in the channel. Furthermore, the multipath patterns die out with time; i.e., the probability of receiving paths decreases with increasing excess delay for large delays since multipath components go through higher path losses and become less detectable at larger delays.

Correlations between Spatially-Separated CIR Profiles

The radio channel's structure and consequently its impulse response profile may change drastically when the receiver's distance to the transmitter increases, among other reasons due to an increase in the number of intervening obstacles. For example, for amplitude fading, increasing the antenna separation normally results in an increase in path loss. "Spatial" correlations (i.e., correlation between impulse response profiles taken at points close in space) can be seen in the amplitudes, arrival times, and phases of the radio signal as well as the mean and variance of the amplitudes. However, the degree of these correlations, is likely to be different depending on the intervening obstacles along the channel.

The impulse response profiles taken at points that are close in space are mostly likely correlated since the channel's structure does not change appreciably over very short distances. There may be small-scale local changes in the channel's statistics and large-scale global variations due to shadowing effects and spatial nonuniformities and non-stationarities.

Temporal Variations of the Channel

In general, the radio channel is nonstationary in time and temporal variations may exist partly due to the motion of people and equipment around both transmit and receive antennas. Two sets of data collected inside a room and in a hallway, both having the same antenna separation, may exhibit great differences. Variations in the signal amplitude when both antennas are fixed may be due to the motion of people and equipment in the environment. It is well established that the indoor channel is, in general, time-varying with two types of variations: 1) variation due to the motion of the receiver, 2) variation due to the dynamics of the changing radio channel environments. This makes full characterization of h(t, τ) rather than h(t) more desirable.

Due to the motion of people and equipment in most indoor environments, the radio channel becomes nonstationary in time; i.e., the channel's statistics change, even when the transmitter and receiver are fixed. This is reflected in the time-varying impulse response model h(t, τ). Analysis of this time-varying model, however, is very difficult, so most digital propagation measurements have therefore assumed some form of stationarity while estimating the impulse response profiles.

A review of the literature in [6] shows that, in a number of measurements carried out, either temporal stationarity or quasi-stationarity of the channel have been observed. Other experiments have shown that the channel is "quasi-static" or "wide sense-stationary," only if data is collected over short intervals of time. The assumption of stationary or quasi-static channel in a time span of a few seconds may be reasonable for residential buildings or office environments in which one does not expect a large degree of movement. The situation may be different in crowded shopping malls, supermarkets, etc., where great number of people are always in motion.

A measure of the channel's temporal variation is the width of its spectrum when a single sinusoid (constant envelop) is transmitted. This has been estimated to be about 4 Hz for an office building and a maximum value of 6.1 Hz has also been reported. The "local" and "global" short time variations of the channel have also been reported. This study also includes temporal variations of the RMS delay spread and the received power.

Mean Excess Delay and RMS Delay Spread

The mean excess delay $\tau_m$ and the RMS delay spread $\tau_{rms}$ have been estimated in a number of indoor propagation measurements. Numerical values depend on the size and type of the building, existence or absence of a clear LOS path, etc. Reported values of $\tau_m$ and $\tau_{rms}$ are:

between 20 and 50 ns for small and medium-size office buildings
between 30 and 300 ns for various factory environments
under 100 ns at several university buildings
less than 160 ns over 90% of the area in a shielded building,
less than 80 ns in an office building
under 120 ns in a large office building and
up to 200 ns in other large office buildings Large delay spreads of up to 200 ns have also been reported for smaller office buildings, although such a large delay spread seems to be due to external geographical features. The median RMS delay spreads reported are 96 ns for LOS and 105 ns for the obstructed factory channels, 15.3 ns to 52.6 ns for several other factory environments, between 70 to 90 ns at three dissimilar office buildings, 8.3 ns for a LOS, 8.3 ns and 14.1 ns for two non-LOS situations in an office building, and 25 ns for a medium-size office building. Much smaller median $\tau_{rms}$ of 3 to 13 ns have also been reported for 60-GHz measurements in several buildings.

Measurements in a laboratory building have shown that $\tau_m$, and $\tau_{rms}$, depend on the size of the rooms. Measurements at an office building and a university building, however, indicate that the median $\tau_{rms}$ is about the same for both buildings, but standard deviation of $\tau_{rms}$ depends on the building. Measurements in a large and in a small office building have also shown about the same $\tau_{rms}$. However, the large delay spreads in the small building were attributed to external geographical features. Another investigator has found that $\tau_{rms}$ depends on factory inventory, building construction and location of walls. Average delay spread of 130 ns was obtained in a shielded building.

Dependence of $\tau_{rms}$ on the transmitter-receiver antenna separation has been reported by several investigators. A number of measurements have shown correlation between $T_{rms}$, and transmitter—receiver antenna separation. High linear correlation between $T_{rms}$ and large-scale path losses was observed in a shielded building.

Analysis of a large database of 12 000 impulse response profiles collected at two office buildings has shown that: 1) $\tau_{rms}$ is typically between 10 and 50 ns, with mean values between and 30 ns, and standard deviations between 3 and 5 ns; 2) $\tau_{rms}$ over large areas (1500 profiles collected at each one of four transmitter-receiver antenna separations) can be well described with normal distributions; 3) mean $\tau_{rms}$ increases with increasing antenna separation; 4) $\tau_{rms}$ for spatially adjacent profiles are highly correlated; and 5) average $\tau_{rms}$ at each location has a high linear correlation with the average path loss for that location.

Difference Between the Indoor and Outdoor Mobile Channels

The indoor and outdoor channels are similar in their basic features: they both experience multipath dispersions caused by a large number of radio signal scatterers and reflectors. They can both be described using the same mathematical model. However, there are also major differences, briefly described below:

The conventional mobile outdoor channel (with an elevated base antenna and low-level mobile antennas) is stationary in time and nonstationary in space. Temporal stationarity is due to the fact that signal dispersion is mainly caused by large fixed objects (buildings). In comparison, the effect of people and vehicles in motion are negligible. The indoor channel, on the other hand, is stationary neither in space nor in time. Temporal variations in the indoor channel's statistics are due to the motion of people and equipment around the low-level portable antennas.

The indoor channel is characterized by higher path losses and sharper changes in the mean signal level, as compared to the mobile outdoor channel. Furthermore, applicability of a simple negative-exponent distance-dependent path loss model, well established for the mobile outdoor channel, is not universally accepted for the indoor channel.

Rapid motions and high velocities typical of the mobile users are absent in the indoor environment. The indoor channel's Doppler shift is therefore negligible.

Maximum excess delay for the mobile outdoor channel is typically several microseconds if only the local environment of the mobile is considered, and more than 100 ps if reflection from distant objects such as hills, mountains, and city skylines are taken into account. The outdoor RMS delay spreads are of the order of several ps without distant reflectors, and 10 to 20 ps with distant reflectors. The indoor channel, on the other hand, is characterized by excess delays of less than one ps and RMS delay spreads in the range of several tens to several hundreds of nanoseconds (most often less than 100 ns). As a result, for the same level of ISI, transmission rates can be much higher in indoor environments.

Why Use CIR and not Path Loss Models?

While the impulse response approach is useful in characterization of the channel at a microscopic level, path loss models describe the channel at a macroscopic level. Path loss information in indoor environments is essential in determination of the size of the coverage area for radio communication systems, and in selecting optimum locations for base antennas. Obtaining three-dimensional propagation contour plots using a building's blueprint and the knowledge of its construction material is a challenging job which requires detailed and reliable path loss models. Path loss measurement and modelling has been reported by many investigators [6].

The indoor channel exhibits much larger path losses as compared to the mobile outdoor channel. Furthermore, large variations in the path loss are possible over very short distances. The propagation environment is very complicated and a universally accepted path loss model is not yet available. A review of indoor propagation measurements, however, indicates that there are several distinct path loss models [6]. Path loss models reported in the literature are very different. Even with a given model, the range of parameters is large, and the dependence on the environment is not well established.

Path loss in an indoor environment is very severe most of the time. It is also very dynamic, changing appreciably over short distances. Simple path loss rules are successful in describing the mobile outdoor channel, but not the indoor channel. Any realistic channel model should take the above factors into account. Furthermore, it should derive its parameters from actual field measurements rather than basing them on simplified theory. Mathematical analysis of systems reported in the literature for the mobile outdoor and indoor channels are often based on standard (but oversimplified) assumptions. Because of these oversimplifications, the reliability of any system simulation result is questionable. It should be noted that while elaborate simulations are needed for accurate results, simpler theoretical models should not be entirely dismissed since they are useful for providing insight.

The CIR is a wideband channel characterization and contains all information necessary to analyse any type of radio transmission through the channel. It has been shown that a mobile radio channel can be modelled as a linear filter with a time varying impulse response, where the time variation is due to receiver motion in space. The filtering nature of the radio channel is caused by the summation of the amplitudes and delays of the multiple arriving signal path components at any instant of time.

The CIR is a very useful characterization of the channel, since it may be used for channel equalization and also to predict and compare the performance of many different mobile communication systems and transmission bandwidths for a particular mobile channel condition. The small-scale variations of a mobile radio signal are directly related to the impulse response of the mobile radio channel. A mobile radio channel can be modelled as a linear filter with a time varying impulse response, where time variation is due strictly to receiver motion in space.

Consider the case of a receiver moving along the ground at some constant velocity v. For a fixed position d, the channel between the transmitter and the receiver can be modelled as a linear time-invariant system. However, due to the different multipath waves which have propagation delays which vary over different spatial locations of the receiver, the impulse response of the linear time-invariant channel should be a function of the position of the receiver. That is, the CIR can be expressed as h(d, t). Let x(t) represent the transmitted signal, then the received signal y(d, t) at position d can be expressed as a convolution of x(t) with h(d, t)

$$y(d,t)=x(t)\otimes h(d,t)=\int_{-\infty}^{\infty}x(\tau)h(d,t-\tau)d\tau \quad (23)$$

For a causal system, h(d, t)=0, for t<0, thus (23) reduces to $$y(d,t)=\int_{-\infty}^{t}x(\tau)h(d,t-\tau)d\tau \quad (24)$$

Since the receiver moves along the ground at a constant velocity v, the position of the receiver can be expressed as d=vt which when used in the equation above yields $$y(vt,t)=\int_{-\infty}^{t}x(\tau)h(vt,t-\tau)d\tau \quad (25)$$

Since v is a constant, y(vt, t) is just a function of t. Therefore, the equation can be expressed as $$y(t)=\int_{-\infty}^{t}x(\tau)h(vt,t-\tau)d\tau=x(t)\otimes h(vt,t)=x(t)\otimes h(d,t) \quad (26)$$

From this equation, it can be seen that the mobile radio channel can be modelled as a linear time-varying channel, where the channel changes with time and distance. Since v may be assumed constant over a short time (or distance) interval, x(t) can represent the transmitted bandpass waveform, y(t) the received waveform, and h(t, τ) the impulse response of the time varying multipath radio channel. The impulse response h(t, τ) completely characterizes the channel and is a function of both t and τ. The variable t represents the time variations due to motion, whereas τ represents the channel multipath delay for a fixed value of t. The received signal y(t) can be expressed as a convolution of the transmitted signal x(t) with the channel impulse response h(t, τ)

$$y(t)=\int_{-\infty}^{\infty}x(\tau)h(t,\tau)d\tau=x(t)\otimes h(t,\tau) \quad (27)$$

Channel Estimation in OFDM Systems

In recent years, there has been a lot of interest in applying orthogonal frequency-division multiplexing (OFDM) in wireless and mobile communication systems because of its various advantages in lessening the severe effects of frequency-selective fading. However, the high-rate and spectrum efficient OFDM systems employing multilevel modulation schemes with non-constant amplitude (e.g., 16QAM) generally require estimation and tracking of the fading channel parameters to perform coherent demodulation.

Figure 10:
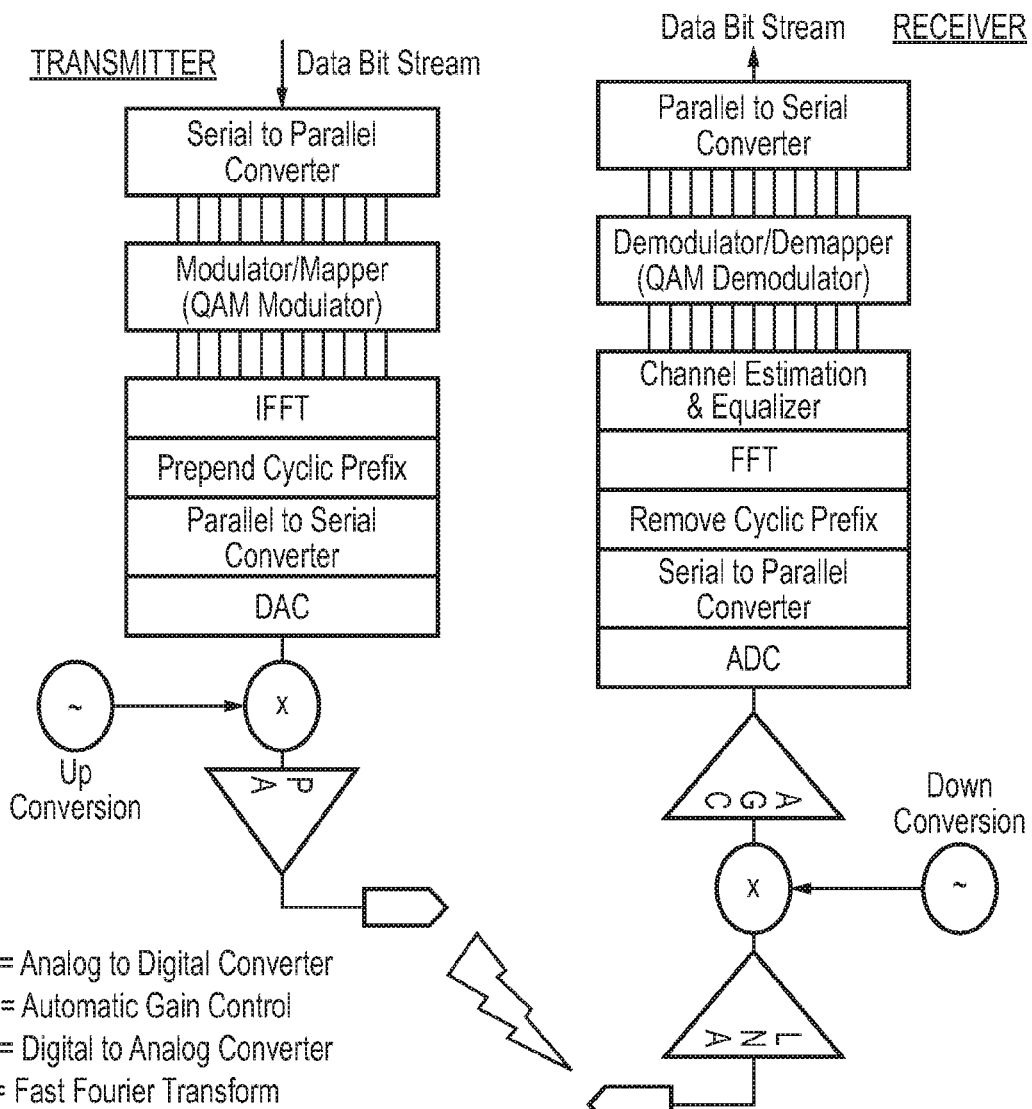
FIG. 10 illustrates the architecture of an OFDM-based wireless transmitter and receiver pair.
Figure 11:
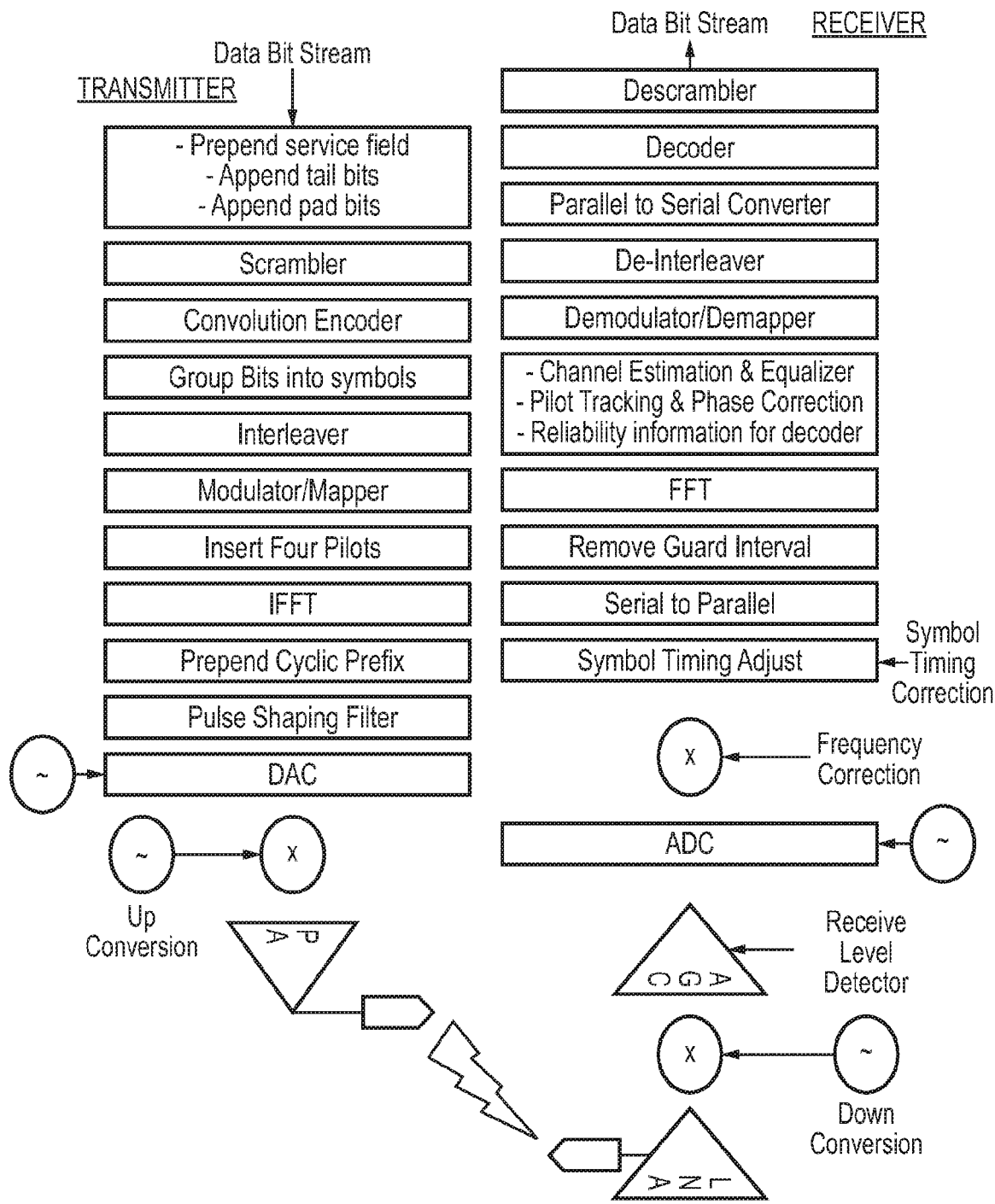
FIG. 11 illustrates the architecture of an IEEE 802.11a transmitter and receiver pair.

In a typical WLAN system implementing OFDM such as IEEE 802.11 a/g/n/ac, the channel estimation in the frequency domain is readily available, since it is computed for channel equalization. Therefore, it is possible to take advantage of the availability of the CTF estimation (or CIR) to compute the metrics for AP location validation. FIG. 10 and FIG. 11 show block diagrams of a typical OFDM-based receiver systems where the CTF extraction functions are highlighted. The CIR can be obtained given the CTF (which is the Fourier transform of the CIR) and vice versa. The CIR is simply the time domain equivalent of the CTF (which is in frequency domain).

In an OFDM-based system there are typically $N_c$ subcarriers of which only $N_u+1$ are used for data at the central of the given spectrum. The $(N_c-N_u+1)/2$ on each side are used as a guard band to avoid out-of-band interference. Each subcarrier is modulated by a symbol $S_i^n$ where i is the index of the OFDM symbol and n is the subcarrier index. The bandwidth of an OFDM system is 1/T where T is the sampling interval. $T_s=T_u+T_G$ is the duration of the entire OFDM symbol where $T_u$ is the duration of the data within the symbol and $T_G$ is the guard interval. The subcarrier spacing is $\Delta f=1/T_u$ which means that $T=1/(\Delta f N_c)=T_u/N_c$. The output baseband signal of the transmitter is given by [7]

$$s(t) = \sum_{i=-\infty}^{\infty}\sum_{n=-N_u/2}^{N_u/2} S_i^n P_i^n(t) \otimes g_T(t) \quad (28)$$

where $g_T(t)$ is the impulse response of the transmit filter, $\otimes$ is the convolution operation and $P_i^n(t)$ is the subcarrier pulse which can be described as $$P_i^n(t) = \begin{cases} e^{j2\pi \frac{n}{T_u}(t-T_G-iT_s)}, & T_s \leq t < (i+1)T_s \\ 0, & \text{else} \end{cases} \quad (29)$$

The signal s(t) is transmitted over a Rayleigh multipath fading channel with an impulse response given by $$g(t,\tau) = \sum_{l=1}^{L} g_l(t)\delta(\tau - \tau_l) \quad (30)$$

where $g_l(t)$ and $\tau_l$ are the complex path gain and delay of the lth path and L is the number of multipath components. Note that $g_l = \alpha_l e^{j\phi_l}$ contains the amplitude $\alpha_l$ and phase $\phi_l$ information. The nth subcarrier output during the ith OFDM symbol is $$Y_i^n = S_i^n G_i^n G_T(n) G_R(n) + z_i^n, -N_u/2 \leq n \leq N_u/2 \quad (31)$$

where $G_i^n$ is nth sample of the CTF (DFT of the impulse response $g(t, \tau)$). $G_T(n)$ and $G_R(n)$ are the transmitter and receiver filter frequency response values at the nth subcarrier. $z_i^n$ is a white complex Gaussian noise with variance $\sigma^2$. It can be assumed that the $N_u+1$ subcarriers operate within the flat region of the transmitter and receiver filter frequency responses and as a result $G_T(n)=G_R(n)=1$. The output can then be given by $$Y_i^n = S_i^n G_i^n + z_i^n, -N_u/2 \leq n \leq N_u/2 \quad (32)$$

where $G_i^n$ is $$G_i^n = \sum_{l=1}^{L} g_l(iT_s) \exp\left(-\frac{j2\pi n \tau_l}{N_c T}\right) \quad (33)$$

which is the nth sample of the CTF (one of the $N_u+1$ subcarriers). $iT_s$ is the duration of the ith OFDM symbol. Thus, for the ith symbol, it is possible to extract samples of the CTF from the received signal or $G_i=[G_i^1, G_i^2, \ldots, G_i^{N_s}]^T$, where $N_s$ is the number of samples in the CTF. In OFDM systems the CTF is commonly estimated by using pilot signals and in the case that all subcarriers in the OFDM symbol are used as pilots then $N_s=N_u$. It is typically assumed that the guard interval duration $T_G$ is longer than the channel maximum excess delay $\tau_{max}$, (preferably, $T_G \gg \tau_{max}$), which means that the channel is quasi-stationary and the channel does not change within one OFDM symbol but may vary between symbols [7]. Thus, the estimated CTF can be considered a random process in both space (channel structure vary randomly with location) and time (corrupted by a white noise process) and at the jth location it can be modeled by $$\hat{G}^j = G^j + w \quad (34)$$

where w is a random white process modeling the noise with zero mean and standard deviation $\sigma_w$. The CTF estimate can be obtained from one transmitted/received OFDM symbol or over an average of N OFDM symbols. In either case, a CTF estimate ($\hat{G}^j$) for the channel between a transmitter at location j and receiver at location m can be used to estimate the respective CIR of the channel $\hat{C}_m^j$.

Estimating the Entropy of Signals

From information theory, the (Shannon) entropy of a random variable X is defined as [8]

$$H(X) = -E_X[\log_2 p_X] = \int_{-\infty}^{\infty} p_X(x) \log_2 p_X(x) dx \quad (35)$$

where $p_X(x)$ is the probability density function (PDF) of X. In most practical applications, the direct evaluation of (35) is difficult because it is not easy to compute or estimate the entropy from real data. Typically, most methods rely on estimating the PDF through histograms [10][11], order statistics or kernel methods [14][15]. Reference [9] proposed a more practical and efficient (alternative) technique to estimate the entropy of a random signal. This technique computes an estimate of entropy by estimating the PDF of the random variable. The technique takes advantage of the key findings in [9] that the PDF of a random variable X can be estimated simply by appealing to the theory of Power Spectral Density (PSD) estimation. An estimate of the PDF $\hat{p}_X(x)$ can be parameterized by a set of coefficients $\{a_k\}$ of an autoregressive (AR) model in the form of a PSD $S_W(x)$ where $1 \leq k \leq p$ is the number of parameters [9][16]

$$\hat{p}_X(x) = S_W(x) = \frac{\sigma_W^2}{\left|1 - \sum_{k=1}^{p} a_k e^{-j2\pi kx}\right|^2} \quad (36)$$

where $\sigma_W^2$ is selected such that $\int_{-1/2}^{+1/2} S_W(f)df=1$ since PSDs are different from PDFs in that they do not usually integrate to 1. By imposing the bound $[-\frac{1}{2}, \frac{1}{2}]$ ensures that the random variable is constrained between these values, since a general PDF is not periodic with period one as is imposed by the AR model [16]. This can be easily achieved by normalizing the data by $k\sigma_W$ where $\sigma_W$ is the standard deviation and k is a suitable parameter [16].

To clarify why the modelling of the PDF can be done using a PSD, it is noted that if $X(\omega, n)$ is a random process then a process $W(\omega, n)$ can be found that has a PSD that matches $p_X(x)$. One such process is $W(\omega, n) = e^{j(nX+\varphi(\omega))}$ where $\varphi(\omega)$ is uniformly distributed over $[0, 2\pi]$ and independent of X [9]. It can be easily shown that the autocorrelation of W, $R_W(k)$, is the first characteristic function of X. The relationship between the PDF and the PSD can then be highlighted through the following Fourier Transform relationships $$R_W(k) \xrightarrow{F} S_W(x) \quad (37)$$

$$\phi_x(k) \xrightarrow{F} p_X(x). \quad (38)$$

From this it follows that if the autocorrelation $R_W(k)$ is equal to the $\phi_x(k)$ then, $p_X(x) = S_W(x)$. As a result, to estimate the PDF $\hat{p}_X(x)$, it is possible to find an AR model of the form in (36). The parameterization in (36) is possible since a large enough model order can be shown to be capable of modelling any PDF in the $\|\cdot\|_\infty$ sense [9]. In order to estimate the model parameters in (36) based on available data $\{x_1, x_2, \ldots, x_{N_s}\}$, it is well known that the Yule-Walker equations relate the AR model parameters to the autocorrelation function [17]. The autocorrelation function in this case are samples of the characteristic function given by [16].

$$F^{-1}\{p_X(x)\} = \phi_x(k) = E[e^{j2\pi xk}] = R_W(k) \quad (39)$$

where $\phi_x(k)$ is the characteristic function and $R_W(k)$ is the autocorrelation function of the underlying process W related to the PSD $S_W(x)$. The autocorrelation function essentially becomes samples of the characteristic function, and in the discussion here, $\phi_x(k)$ and $R_W(k)$ will be used interchangeably and they both refer to (39). To estimate the AR model parameters (and ultimately estimate the PDF), we need to estimate the autocorrelation of the random process which can be given by the sample moment estimator $$\hat{R}_W(k) = \frac{1}{N_s} \sum_{n=0}^{N_s-1} e^{j2\pi k x(n)} \tag{40}$$

where k=0, . . . , p and $N_s$ is the number of samples in the data vector. The AR model parameters can then be determined by solving the Yule-Walker equations [16][17]

$$\hat{R}_W \hat{a} = \hat{r}_W \tag{41}$$

$$\begin{bmatrix} \hat{R}_W(0) & \hat{R}_W(-1) & \cdots & \hat{R}_W(-(p-1)) \\ \hat{R}_W(1) & \hat{R}_W(0) & \cdots & \hat{R}_W(-(p-2)) \\ \vdots & \vdots & \ddots & \vdots \\ \hat{R}_W(p-1) & \hat{R}_W(p-2) & \cdots & \hat{R}_W(0) \end{bmatrix} \begin{bmatrix} \hat{a}(1) \\ \hat{a}(2) \\ \vdots \\ \hat{a}(p) \end{bmatrix} = \begin{bmatrix} \hat{R}_W(1) \\ \hat{R}_W(2) \\ \vdots \\ \hat{R}_W(p) \end{bmatrix} \tag{42}$$

using the Levinson-Durbin recursion. An estimate of $\hat{\sigma}_W^2$ can be computed (once $\hat{a}_k$ are estimated) using $$\hat{\sigma}_W^2 = \hat{R}_W(0) - \sum_{k=1}^{p} \hat{a}(k) \hat{R}_W(-k) \tag{43}$$

which can also be computed using the Levinson-Durbin recursion.

Once the AR parameters of the PSD that models the PDF are computed then the estimate of entropy can be computed by $$\hat{H} = \int_{-1/2}^{1/2} \hat{p}_X(x) \, l log_2 \, \hat{p}_X(x) dx = \int_{-1/2}^{1/2} S_W(x) \, \log_2 S_W(x) dx \tag{44}$$

A more relevant/practical expression can be obtained applying Plancherel-Parseval formula to the right-hand side of (44) [9] which yields $$\hat{H} = -\sum_{k=-\infty}^{\infty} R_W(k) C_W^*(k) \tag{45}$$

where $R_W(k)$ is the $k^{th}$ correlation coefficient and $C_W(k) = FT^{-1}\{\log_2 S_W(x)\}$ is the $k^{th}$ component of its Cepstrum [17]. Since $S_W(x)$ is real, both $R_W(k)$ and $C^*_W(k)$ have Hermitian symmetry and thus (45) can be expressed as $$\hat{H} = -2\text{Re}\left\{\sum_{k=0}^{\infty} R_W(k) C_W^*(k)\right\}. \tag{46}$$

Both $R_W(k)$ and $C^*_W(k)$ can be computed recursively as $$R_W(k) = \sum_{i=1}^{p} a_i R_W(k-i) + \sigma_W^2 \delta(k) \tag{47}$$

$$C_W(k) = \begin{cases} \log \sigma_W^2, & \text{if } k = 0 \\ h(k) - \sum_{i=1}^{k-1} \left(\frac{i}{k}\right) C_W(i) h(k-i), & \text{if } k > 0 \end{cases} \tag{48}$$

where h(k) is the impulse response of the AR system and which in turn can be computed recursively as $$h(k) = \sum_{i=1}^{p} a_i h(k-i) + \delta(k) \tag{49}$$

Figure 12:
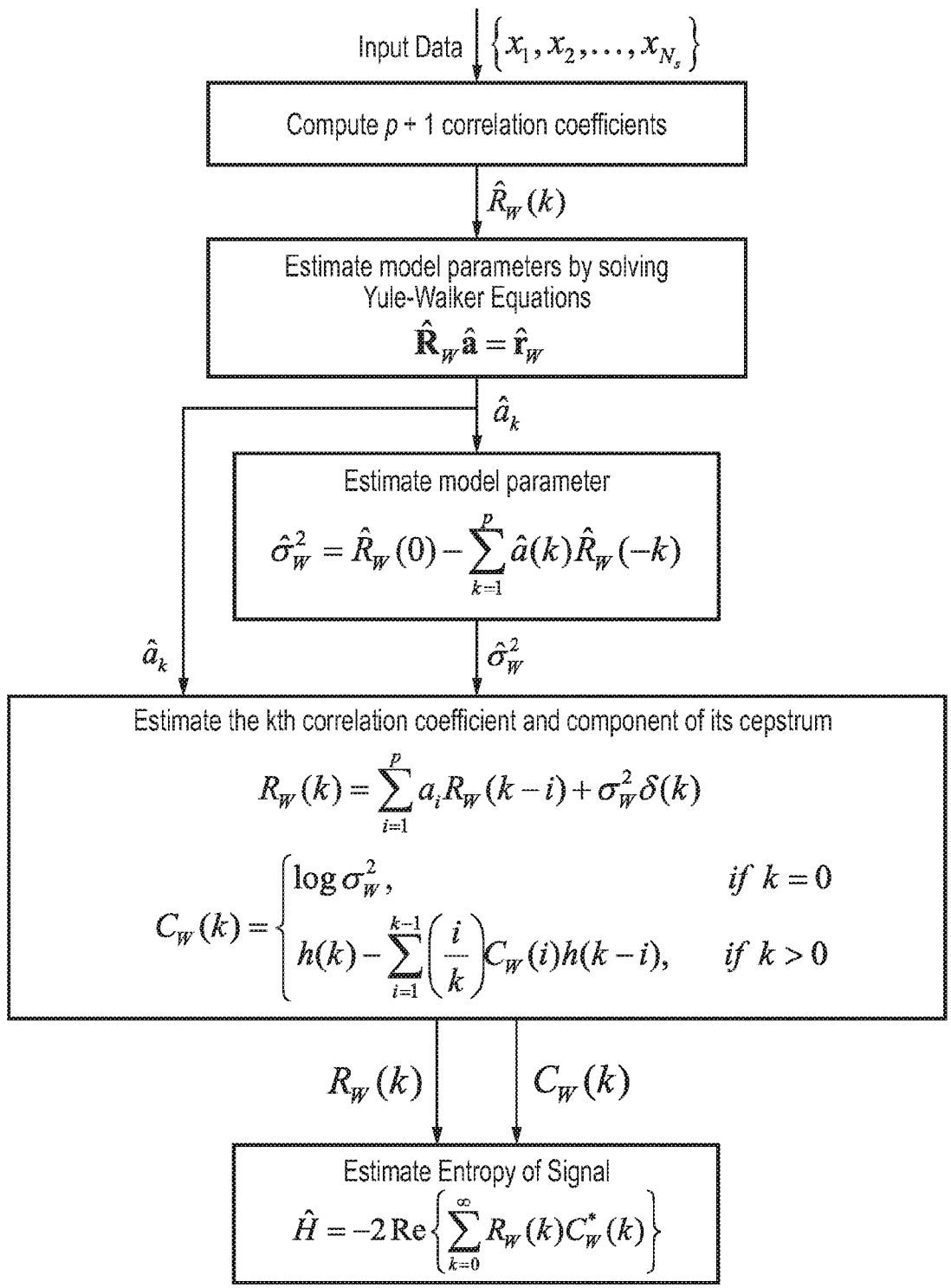
FIG. 12 shows an algorithm for estimating the entropy of a signal.

The entropy estimation procedure of an input sequence of data $\{x_1, x_2, \ldots, x_{N_s}\}$ is summarized in FIG. 12.

Practical Issues to Consider in the Entropy Estimation

In practice, modelling a PDF accurately using the AR technique requires a long AR model, i.e., large number of AR coefficients. It is well known from spectral estimation theory that too low a model order will produce inadequate resolution which yields to estimator bias, and a high model order results in loss of stability of the estimate which produces spurious peaks, i.e. large variance [9][16]. To address the long AR model problem, the AR parameters can be obtained as a regularized least-squares solution [9] [18]

$$\hat{a} = (\hat{R}_W + \lambda \Gamma_k)^{-1} \hat{r}_W \tag{50}$$

where $\Gamma_k$ is the diagonal matrix with elements $[\Gamma_k]_{ii} = i^{2k}$ incorporating the prior knowledge about the "smoothness" of the spectrum (see [18] for further details). The parameter $\lambda$ is a hyperparameter that balances a fidelity to the data and a smoothness prior [18]. A selection rule for $\lambda$ has been derived in [18][19] which minimizes the following marginal likelihood $$L(\lambda) = \log(\det(\hat{R}_W + \lambda \Gamma_k)) - p \log \lambda - N \log(\sigma_W^2) \tag{51}$$

where $\sigma_W^2$ ensures that the AR probability distribution is properly normalized.

Recursive Algorithm for Entropy Estimation

Most of the entropy estimation equations above can be computed recursively. The correlation sequence in (40) can be estimated recursively by $$R_W^{N_s}(k) = \frac{1}{N_s} \sum_{n=0}^{N_s} e^{j2\pi k x(n)} = \frac{N_s - 1}{N_s} R_W^{N_s-1}(k) + \frac{1}{N_s} e^{j2\pi k x(N_s)}. \tag{52}$$

Adaptive entropy estimation can be done by recursively computing the autocorrelation matrix [9]

$$\hat{R}_W^{n+1} = \frac{1}{n+1}\left[n\mu \hat{R}_W^{(n)} + \zeta(n+1)\zeta(n+1)^T\right] \tag{53}$$

where $\mu$ is a forgetting factor and $\zeta(n+1)^T = [e^{-j(x_{n+1}+\phi)}, \ldots, e^{-j(px_{n+1}+\phi)}]$. The AR parameters can also be recursively computed, which avoids matrix inversion required in (50). The recursive regularized least squares solution can be computed using a gradient approach [9]

$$\hat{a}^{(n+1)} = \hat{a}^n + \beta(\hat{R}_W^{(n)} + \lambda \Gamma_k)\hat{a}^{(n)} - \hat{r}_W^{(n)}. \tag{54}$$

At each stage, after updating the autocorrelation function and computing the recursive model parameters, equations (23)-(25) can be used to compute the entropy recursively.

Location Validation using Entropy Estimate of CIR

In the embodiments of the present invention, a novel technique for validating the location of reference points in a localization system is provided that is based on the concept of entropy estimation of changes in the impulse response of a radio channel (the CIR). The entropy of a signal, from information theory, measures the uncertainty associated with a random variable. A reference point at a particular fixed location in in the network (under steady conditions) has a CTF or CIR that has a unique characteristic when communicating with another fixed transmitter or receiver that could be another reference point.

Thus, based on the consideration that the CTF or CIR is in fact random in both space and time, then the samples of the CTF or CIR are samples of a random process. Each transmitter-receiver pair at fixed locations will create a unique realization of the random process and any change in any of their locations (or distance separation) will result in a non-zero CIR change which can be expressed as an entropy index. Thus, the entropy of the change in CIR can reveal significant information regarding whether any reference point in the location system has been accidentally moved from its desired fixed location. It has been shown that entropy is a more robust technique to detect abrupt changes in distributions. With the ability to estimate the CIR or CTF efficiently as highlighted above, an entropy-based metric can be practically constructed from the measured CTF or CIR between any two reference points in the localization system.

The discrete-time CIR model is convenient model for characterizing the radio channel and using it in the computation of the entropy of the CIR. In this model, the time axis is assumed to be quantized into small fixed time intervals, $\tau_{i+1}-\tau_i=\Delta\tau$, called "bins" ("excess delay bins") where each bin is assumed to contain either one multipath component, or no multipath component. It is assumed a reasonable bin size to be based on the resolution of the specific CIR estimation setup and the characteristics of the radio signal, and assume that any two paths arriving within a bin cannot be resolved as distinct paths. Note that some bins may have no multipath at some time t and delay $\tau_i$, since $a_i(t, \tau)$ may be zero. Each impulse response is described by a sequence of 0s and 1s (a path indicator sequence), where a 1 indicates presence of a path in a given bin and a 0 represents absence of a path in that bin. Also an amplitude and a phase value is associated to each 1.

In this model, M represents the total number of possible equal-spaced multipath components, including the first arriving components. Any number of multipath signals received within the ith bin are represented by a single resolvable multipath component having delay $\tau_i$. This method of quantizing the delay bins determines the time delay resolution of the channel model, and the useful frequency span of the model can be shown to be $2/\Delta\tau$. That is, the model can be used to analyse transmitted RF signals having bandwidth which are less than $2/\Delta\tau$. In this case, the maximum excess delay of the multipath channel is given by $M\Delta\tau$.

It is important to note that, depending on the choice of $\Delta\tau$ and the physical channel delay properties, there may be two or more multipath signals that arrive within an excess delay bin that are unresolvable and that vectorially combine to yield the instantaneous amplitude and phase of a single modelled multipath component. Such situations cause the multipath amplitude within a delay bin to fade over the local area. However, when only a single multipath component arrives within an excess delay bin, the amplitude over the local area for that particular time delay will generally not fade significantly.

Many techniques exist for the channel estimation for OFDM systems [2] and it is assumed here that a suitable method has been used to estimate the CIR. After system setup and when the AP locations are precisely known and recorded, each AP, $AP_j$ (FIG. 2), estimates its baseline or reference CIR, $R_{h,1j}$, relative to the anchor $AP_1$. Periodically, in the system operations phase (for example, once a day), $AP_j$ estimates its CIR, $C_{h,1j}$, relative to the anchor $AP_1$.

Figure 13:
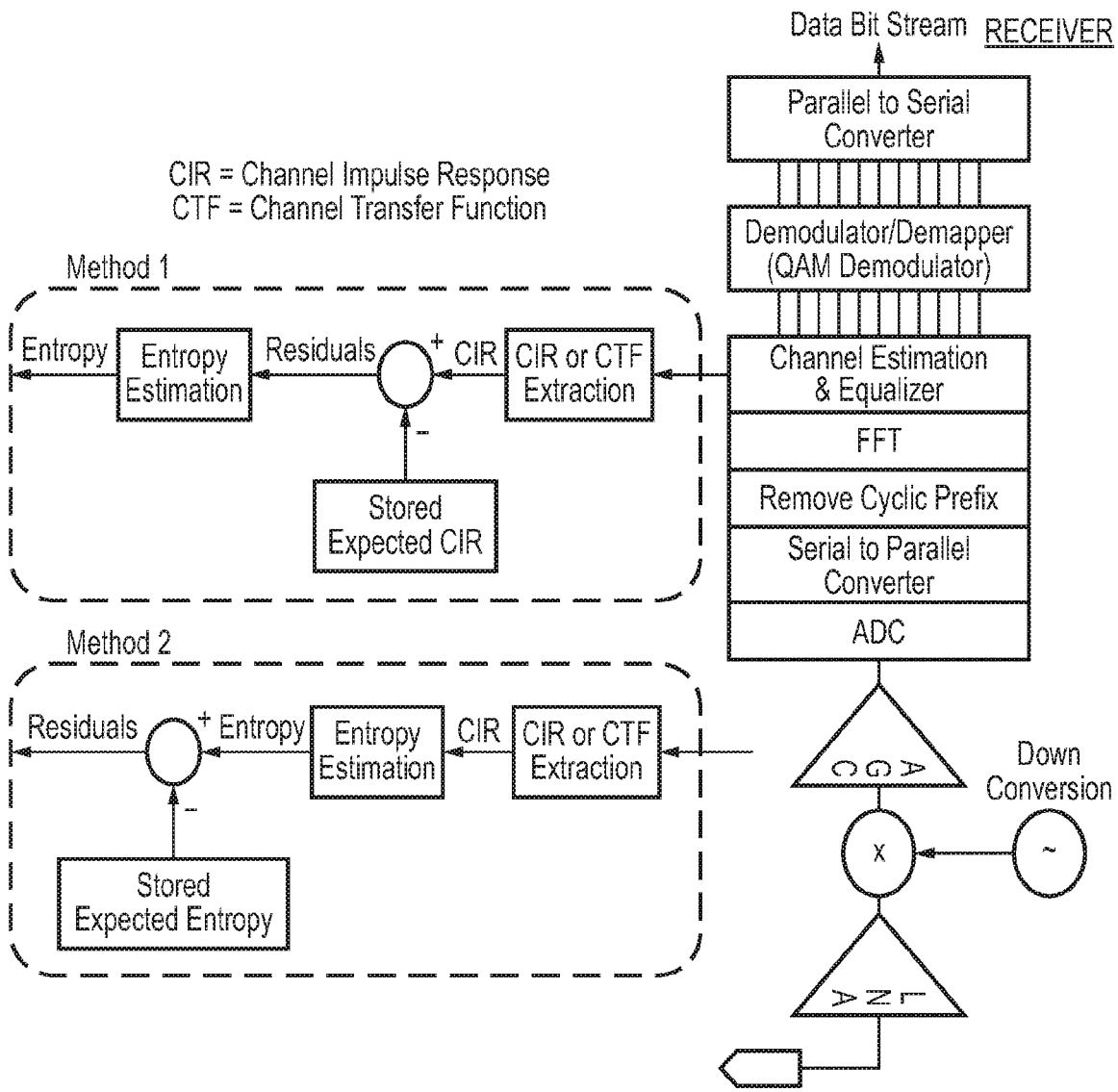
FIG. 13 shows alternative approaches to entropy estimation in an OFDM-based wireless receiver.

The embodiments below describe two methods for computing the validity metric using the entropy of the CIR (as shown in FIG. 13). To avoid distortions caused by the motion of people and equipment, the location validation system can be activated late at night or during the weekends when movements around both transmitter and receiver antennas will be minimized. Even if the transmitter and receiver remain perfectly still, the channel will change as people open and close doors or pull out file cabinet drawers. Small differences in the arrival time of the different signal can make a big difference in the received signal characteristics and quality.

Method 1: Using the Entropy of the Difference of the Two CIRs

In this embodiment, reference point $AP_j$ calculates its change in CIR with respect to the anchor $AP_1$ as $E_{h,1j}=C_{h,1j}-R_{h,1j}$. Both $C_{h,1j}$ and $R_{h,1j}$ are vectors that consist of the different path gains corresponding to the different path delays ("bins") on the radio channel and where we assume both CIR estimates have the same maximum number of paths ("bins"), that is, the number of detectable multipath components in the impulse response. The entropy estimate is calculated from the elements of the vector $E_{h,1j}$ to obtain an entropy value $\hat{H}_{E,1j}$ which is a validity metric in the system operations phase for checking if $AP_j$ has been moved with respective to the anchor $AP_1$.

The entropy estimation technique introduced above forms the basis of the proposed entropy-based reference point location validation. For an OFDM based system, the entropy estimate for each reference point $AP_j$ with respect to the anchor $AP_1$ can be derived from the time averaged (over L symbols) of the entropy estimate at each symbol $(\hat{H}_{SE,1j})_l$, l=1, 2, ... L, that is, $$\hat{H}_{E,1j} = \frac{1}{L}\sum_{l=1}^{L} (\hat{H}_{SE,1j})_l \qquad (55)$$

From the entropy value calculated above, the following validity metric is defined:

If $|\hat{H}_{E,1,a}| \geq \theta$, then the position of $AP_{j=a},(x_a,y_a)$, has changed, (56)

where $\theta$ is a prescribed entropy tolerance for the localization system. Note that if the location of $AP_j$ has not changed and assuming the estimates $C_{h,1j}$ and $R_{h,1j}$ are perfect and not contaminated by noise, then $E_{h,1j}=C_{h,1j}-R_{h,1j}$ will be a vector containing all 0s which means $\hat{H}_{E,1j}$ will be equal to 0. The tolerance $\theta$ is introduced because, real systems are not perfect or noise free, and also the CIR estimations are affected by both channel and estimation noise.

Method 2: Using the Difference of the Entropies of the Individual CIRs

In this embodiment, $AP_j$ calculates its CIR $R_{h,1j}$ and its corresponding entropy $\hat{H}_{R,1j}$ with respect to $AP_1$. The entropy estimate $\hat{H}_{R,1j}$ is calculated from the elements of the vector $R_{h,1j}$. $AP_j$ also computes periodically its CIR $C_{h,1j}$ and its corresponding entropy $\hat{H}_{C,1j}$ with respect to $AP_1$. Both $\hat{H}_{R,1j}$ and $\hat{H}_{C,1j}$ are scalar quantities that can be used to develop a validity metric in the system operations phase for checking if $AP_j$ has been moved with respective to the anchor $AP_1$. We assume both CIR estimates have the same maximum number of multipaths. From the entropy values calculated above, the following validity metric is defined:

If $|\hat{H}_{C,1,a}-\hat{H}_{R,1,a}| \geq \phi$, then the position of $AP_{j=a}, (x_a, y_a)$ has changed, (57)

where $\phi$ is a prescribed entropy tolerance for the localization system. Note that if the location of $AP_j$ has not changed and assuming the estimates $C_{h,1j}$ and $R_{h,1j}$ are perfect and not contaminated by noise, then $\hat{H}_{C,1j}-\hat{H}_{R,1j}$ will be equal to 0. The tolerance $\phi$ is introduced because real systems are not perfect or noise free and also the CIR estimations are affected by both channel and estimation noise.

The systems and methods of the above embodiments may be implemented in a computer system (in particular in computer hardware or in computer software) in addition to the structural components and user interactions described.

The term "computer system" includes the hardware, software and data storage devices for embodying a system or carrying out a method according to the above described embodiments. For example, a computer system may comprise a central processing unit (CPU), input means, output means and data storage. Preferably the computer system has a monitor to provide a visual output display. The data storage may comprise RAM, disk drives or other computer readable media. The computer system may include a plurality of computing devices connected by a network and able to communicate with each other over that network.

The methods of the above embodiments may be provided as computer programs or as computer program products or computer readable media carrying a computer program which is arranged, when run on a computer, to perform the method(s) described above.

The term "computer readable media" includes, without limitation, any non-transitory medium or media which can be read and accessed directly by a computer or computer system. The media can include, but are not limited to, magnetic storage media such as floppy discs, hard disc storage media and magnetic tape; optical storage media such as optical discs or CD-ROMs; electrical storage media such as memory, including RAM, ROM and flash memory; and hybrids and combinations of the above such as magnetic/optical storage media.

While the invention has been described in conjunction with the exemplary embodiments described above, many equivalent modifications and variations will be apparent to those skilled in the art when given this disclosure. Accordingly, the exemplary embodiments of the invention set forth above are considered to be illustrative and not limiting. Various changes to the described embodiments may be made without departing from the spirit and scope of the invention.

In particular, although the methods of the above embodiments have been described as being implemented on the systems of the embodiments described, the methods and systems of the present invention need not be implemented in conjunction with each other, but can be implemented on alternative systems or using alternative methods respectively.

REFERENCES

[1]. Ezio Biglieri, *Coding for Wireless Channels*, Springer, 2005.
[2]. Mehmet Kemal Ozdemir and Huseyn Arslan, "Channel Estimation for Wireless OFDM Systems", *IEEE Communications Surveys & Tutorials*, 2nd Quarter 2007
[3]. David Tse and Pramod Viswanath, *Fundamentals of Wireless Communication*, Cambridge University Press, 2005.
[4]. G. L. Turin, et al., "A Statistical Model of Urban Multipath Propagation," *IEEE Trans. Vehicular Techn.*, vol. VT-21, pp. 1-9, February 1972.
[5]. National Instruments, "Impulse Response Model of a Multipath Channel", *White Paper*, Sep. 25, 2013.
[6]. Homayoun Hashemi, "The Indoor Radio Propagation Channel", *Proceedings of the IEEE*, Vol. 81, No. 7, July 1993.
[7]. B. Yang, K. B. Letaief, R. S. Cheng and Z. Cao, "Channel Estimation for OFDM Transmission in Multipath Fading Channels based on Parametric Channel Modeling," *IEEE Trans. on Commun.*, vol. 49, no. 3, March 2001.
[8]. C. E. Shannon, "A Mathematical Theory of Communication," *Bell Syst. Tech. J.*, vol. 27, pp. 379-423; 623-656, July/October 1948 [Online] Available http://cm.bell-labs.com/cm/ms/what/shannonday/paper.html.
[9]. J.-F. Bercher, C. Vigant, "Estimating the Entropy of a Signal with Applications", *IEEE Trans. on Signal Processing*, vol. 48, no. 6, pp. 1687-1694, June 2000.
[10]. R. Moddemeijer, "On Estimation of Entropy and Mutual Information of Continuous Distributions," *Signal Processing*, vol. 16, no. 3, pp. 233-246, 1989.
[11]. P. Hall and S. Morton, "On the Estimation of Entropy," *Ann. Inst. Stat. Math.*, vol. 45, pp. 69-88, 1993.
[12]. O. Vasicek, "A Test of Normality based on Sample Entropy," *J. R. Stat. Soc. Ser. B*, vol. 38, pp. 54-59, 1976.
[13]. J. C. Correa, "A New Estimator of Entropy," *Commun. Stat.-Theory Methodol.*, vol. 24, pp. 2439-2449, 1995.
[14]. P. Viola, N. N. Schraudolph and T. J. Sejnowski, "Empirical Entropy Manipulation for Real-World Problems," in *Advances in Neural Information Processing Systems* 8. Cambridge, MA: MIT Press, 1996.
[15]. D. T. Pham, "Blind Separation of Instantaneous Mixture of Sources via an Independent Component Analysis," *IEEE Trans. Signal Processing*, vol. 44, pp. 2768-2779, November 1996.
[16]. S. Kay, "Model-Based Probability Density Function Estimation," *IEEE Signal Processing Letters*, vol. 5, no. 12, December 1998.
[17]. M. H. Hayes, *Statistical Digital Signal Processing and Modeling*, John Wiley & Sons, Inc., 1996.
[18]. G. Kitagawa and W. Gersh, "A Smoothness Priors Long AR Model Method for Spectral Estimation," *IEEE Trans. Automat. Contrl.*, vol. AC-30, pp. 57-65, 1985.
[19]. J.-F. Giovannelli, G. Demoment and A. Herment, "A Bayesian Method for Long AR Spectra Estimation: A Comparative Study," *IEEE Trans. Ultrason. Freq. Ferroelect.*, vol. 43, pp. 220-233, March 1996.
[20]. James Aweya, Nayef Al Sindi, and Kin Poon, "Method and System for Localization", U.S. Pat. No. 8,880,105, Nov. 14, 2014.

All references referred to above are hereby incorporated by reference.

The invention claimed is:

1. A method of determining whether the location of a first one of a plurality of reference points used in a wireless location system has changed, the reference points each having a known initial position, the method including the steps of:

estimating a channel impulse response of a wireless channel between the first reference point and a second of said plurality of reference points;

determining the difference between the estimated channel impulse response and a previously-estimated channel impulse response of the wireless channel;

estimating an entropy of the difference between the channel impulse responses; and determining, from said comparison, whether the location of the first reference point has changed.

2. The method of claim 1 wherein the location of the first reference point is determined to have changed if the entropy of the difference between the channel impulse responses is greater than a predetermined threshold.

3. The method of claim 1 wherein the previously-estimated entropy or the previously-estimated channel impulse response are determined when the reference points are at their initial positions.

4. The method of claim 1 wherein the estimation of the channel impulse response uses a discrete-time channel impulse response model.

5. The method of claim 1 wherein the steps are performed with a plurality of the reference points as the first reference point.

6. The method of claim 5 wherein the same reference point is used as the second reference point for each of the plurality of reference points as the first reference point.

7. The method of claim 1 wherein the steps of estimating, comparing and determining are performed periodically while the location system is operational.

8. A method of determining the location of a mobile device, the method including the mobile device exchanging wireless messages with a plurality of reference points having known initial positions and determining the location of the mobile device from the timing of the sending and receiving of said messages, wherein the method further includes determining whether the location of any of the reference points has changed by:

estimating an entropy of the channel impulse response of a wireless channel between the first reference point and a second of said plurality of reference points;

comparing the estimated entropy to a previously-estimated entropy for the channel impulse response of the wireless channel; and determining, from said comparison, whether the location of the first reference point has changed.

9. The method of claim 8 wherein the location of the first reference point is determined to have changed if the difference between the estimated entropy and the previously-estimated entropy is greater than a predetermined threshold.

10. The method of claim 8 wherein the previously-estimated entropy or the previously-estimated channel impulse response are determined when the reference points are at their initial positions.

11. The method of claim 8 wherein the estimation of the channel impulse response uses a discrete-time channel impulse response model.

12. The method of claim 8 wherein the steps are performed with a plurality of the reference points as the first reference point.

13. The method of claim 12 wherein the same reference point is used as the second reference point for each of the plurality of reference points as the first reference point.

14. The method of claim 8 wherein the steps of estimating, comparing and determining are performed periodically while the location system is operational.

15. The method of claim 8 wherein, when determining the location of the mobile device, the method does not use any reference point whose location is determined to have changed.

16. A location system having a plurality of reference points each having a known initial position and arranged to exchange wireless messages with a mobile device to determine the location of the mobile device, the system including a processor which is arranged to:

estimate a channel impulse response of a wireless channel between the first reference point and a second of said plurality of reference points;

determine the difference between the estimated channel impulse response and a previously-estimated channel impulse response of the wireless channel;

estimate an entropy of the difference between the channel impulse responses; and determine, from said comparison, whether the location of the first reference point has changed.

17. The system of claim 16 wherein the processor is arranged to determine that the location of the first reference point has changed if the entropy of the difference between the channel impulse responses is greater than a predetermined threshold.

18. The system of claim 16 wherein the previously-estimated entropy or the previously-estimated channel impulse response are determined when the reference points are at their initial positions.

19. The system of claim 16 wherein the processor is arranged to estimate of the channel impulse response by using a discrete-time channel impulse response model.

20. The system of claim 16 wherein the processor is arranged to carry out the steps of estimating, comparing and determining with a plurality of the reference points as the first reference point.

21. The system of claim 20 wherein the same reference point is used as the second reference point for each of the plurality of reference points as the first reference point.

22. The system of claim 16 wherein the processor is arranged to carry out the steps of estimating, comparing and determining periodically while the location system is operational.

23. The system of claim 16 wherein, if the location of the first reference point is determined to have changed, the system is arranged not to use that reference point in subsequent location determinations.

24. A location system having a plurality of reference points each having a known initial position and arranged to exchange wireless messages with a mobile device to determine the location of the mobile device, the system including a processor which is arranged to:

determine the location of the mobile device, by:
  exchanging wireless messages with the plurality of reference points having known initial positions; and
  determining the location of the mobile device from the timing of the sending and receiving of said messages, wherein the processor is further arranged to determine whether the location of any of the reference points has changed by:

estimating an entropy of the channel impulse response of a wireless channel between the first reference point and a second of said plurality of reference points;

comparing the estimated entropy to a previously-estimated entropy for the channel impulse response of the wireless channel;

determining, from said comparison, whether the location of the first reference point has changed.

25. The system of claim 24 wherein the processor is arranged to determine that the location of the first reference point has changed if the difference between the estimated entropy and the previously-estimated entropy is greater than a predetermined threshold.

26. The system of claim 24 wherein the previously-estimated entropy or the previously-estimated channel impulse response are determined when the reference points are at their initial positions.

27. The system of claim 24 wherein the processor is arranged to estimate of the channel impulse response by using a discrete-time channel impulse response model.

28. The system of claim 24 wherein the processor is arranged to estimate the entropy recursively.

29. The system of claim 24 wherein the processor is arranged to estimate the entropy by estimating a probability density function.

30. The system of claim 24 wherein the processor is arranged to carry out the steps of estimating, comparing and determining with a plurality of the reference points as the first reference point.

31. The system of claim 30 wherein the same reference point is used as the second reference point for each of the plurality of reference points as the first reference point.

32. The system of claim 24 wherein the processor is arranged to carry out the steps of estimating, comparing and determining periodically while the location system is operational.

33. The system of claim 32 wherein, if the location of the first reference point is determined to have changed, the system is arranged not to use that reference point in subsequent location determinations.

* * * * *